United States Patent
Onabe et al.

(10) Patent No.: US 7,895,467 B2
(45) Date of Patent: Feb. 22, 2011

(54) STORAGE CONTROL SYSTEM AND STORAGE CONTROL METHOD

(75) Inventors: Kenji Onabe, Odawara (JP); Seiki Morita, Odawara (JP)

(73) Assignee: Hitachi, Ltd., Tokyo (JP)

( * ) Notice: Subject to any disclaimer, the term of this patent is extended or adjusted under 35 U.S.C. 154(b) by 451 days.

(21) Appl. No.: 12/007,532

(22) Filed: Jan. 11, 2008

(65) Prior Publication Data

US 2009/0031167 A1     Jan. 29, 2009

(30) Foreign Application Priority Data

Jul. 23, 2007     (JP)     ............... 2007-191360

(51) Int. Cl.
*G06F 11/00*     (2006.01)
(52) U.S. Cl. ............................... 714/7; 714/6
(58) Field of Classification Search ............ 714/6, 714/7
See application file for complete search history.

(56) References Cited

U.S. PATENT DOCUMENTS

| | | | |
|---|---|---|---|
| 2006/0015771 A1 * | 1/2006 | Van Gundy et al. ............ 714/7 |
| 2006/0282573 A1 * | 12/2006 | Maeda et al. ................. 710/62 |
| 2007/0067666 A1 * | 3/2007 | Ishikawa et al. ............... 714/6 |
| 2008/0172571 A1 * | 7/2008 | Andrews et al. ............... 714/6 |
| 2008/0178040 A1 * | 7/2008 | Kobayashi ..................... 714/6 |
| 2009/0199042 A1 * | 8/2009 | Ishikawa et al. ............... 714/7 |

FOREIGN PATENT DOCUMENTS

| | | |
|---|---|---|
| JP | 6-139027 | 10/1992 |
| JP | 11-191037 | 12/1997 |
| JP | 2002-297322 | 3/2001 |

* cited by examiner

*Primary Examiner*—Marc Duncan
(74) *Attorney, Agent, or Firm*—Foley & Lardner LLP

(57) ABSTRACT

Unique information including a logical type name is stored in a user data area of a management area as a media of the alternative disk drive to become an alternative of the storage device. Upon using the alternative disk drive, a disk controller reads the unique information of the alternative disk drive, and determines that copy back is unnecessary when the rotating speed and capacity belonging to the unique information of the alternative disk drive are the same as the rotating speed and capacity of the failed disk drive belonging to RAID, and otherwise determines that copy back is necessary.

12 Claims, 17 Drawing Sheets

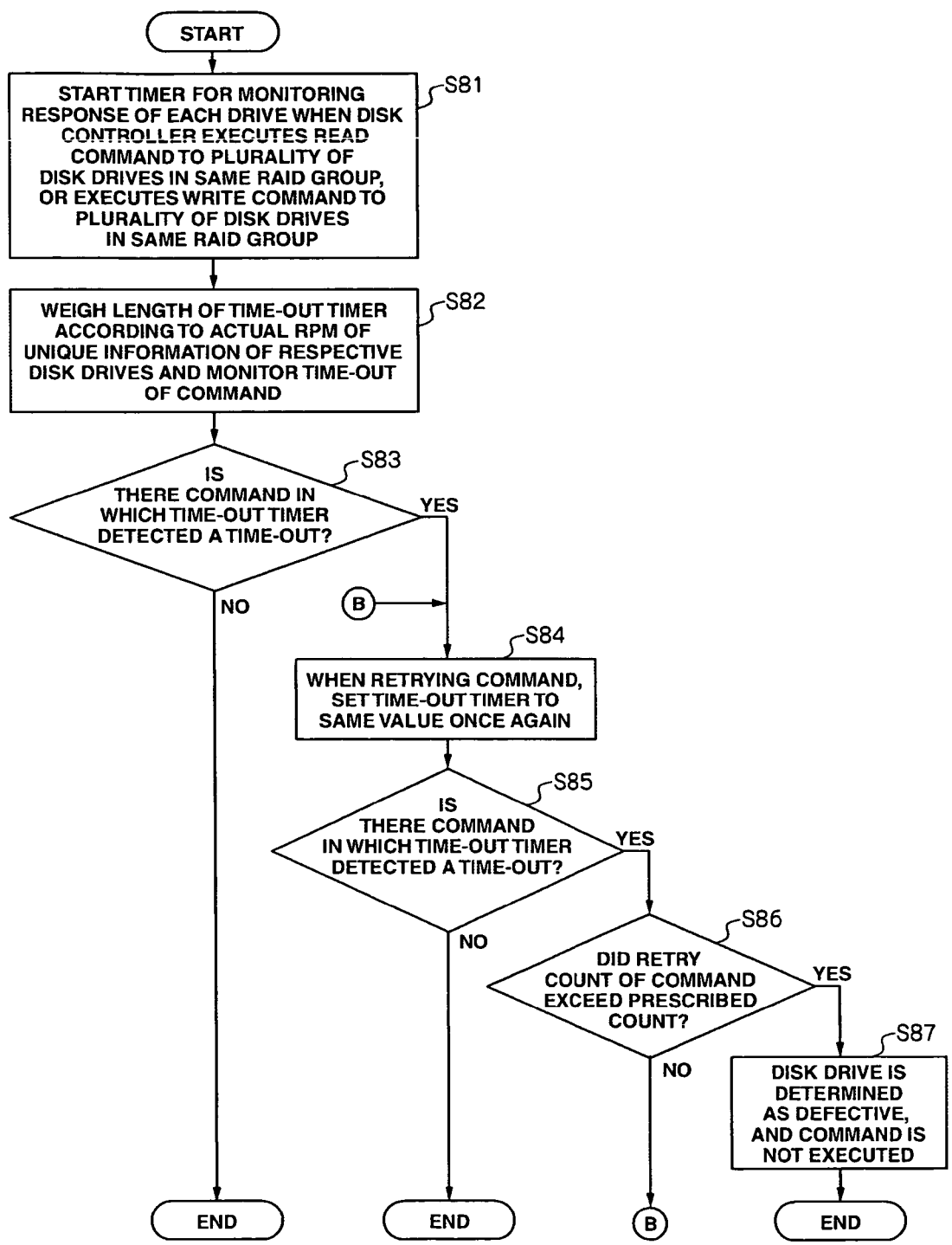

STORAGE CONTROL SYSTEM AND STORAGE CONTROL METHOD

CROSS REFERENCES

This application relates to and claims priority from Japanese Patent Application No. 2007-191360, filed on Jul. 23, 2007, the entire disclosure of which is incorporated herein by reference.

BACKGROUND

The present invention generally relates to a storage control system and a storage control method, and in particular relates to a storage control system connected to a host system and which stores data to be sent to and received from the host system in an HDD (Hard Disk Drive) as a storage medium based on a RAID (Redundant Arrays of Inexpensive Disks) mode, and to a storage control method thereof.

As this kind of storage control system, for instance, known is a type comprising a drive having a rotating storage device for storing data, and a storage controller interposed between the drive and a host system and which controls the transfer of data between the drive and the host system (refer to Japanese Patent Laid-Open Publication No. H11-191037; "Patent Document 1").

Patent Document 1 describes correction copy of recovering all data of a failed drive from the remaining drives of an ECC group (RAID group) and copying such data to a spare disk drive when a failure occurs in a disk drive and becomes inoperable.

Further, as a storage control system comprising a spare disk drive, proposed is a type that recovers data from the other disk drives configuring RAID when one of the disk drives configuring RAID fails, and recovering the operation from a degenerate state of RAID to a normal access state where all disk drives configuring RAID are operable (refer to Japanese Patent Laid-Open Publication No. 2002-297322).

Further, proposed is a storage control system comprising a disk array controller, a disk drive connected to the disk array controller via a drive interface and for storing a plurality of data arranged in an array, and a data backup apparatus for backing up data stored in the disk drive, wherein a plurality of disk drives are used as spare disk drives, the remaining disk drives are used as data/parity disk drives for storing data and the like, and using the spare disk drives as the data/parity disk drives in substituted for failed data/parity disk drives (refer to Japanese Patent Laid-Open Publication No. H6-139027).

In other words, with conventional storage control systems, when a failure occurs in a disk drive, correction copy is started, and the maintenance staff notified of the start of correction copy confirms the completion of correction copy, thereafter replaces the failed disk drive with a normal disk drive, and, after such replacement, the maintenance staff issues a command to the storage control system to copy back the stored information of the spare disk drive to the replaced disk drive.

SUMMARY

With the foregoing conventional storage control system, copy back was not performed if the capacity and rotating speed of the spare disk drive and the failed disk drive are the same, and copy back was performed to the alternative disk drive when the capacity and rotating speed of the spare disk drive and the failed disk drive are different.

Here, since it is not possible to obtain control information from a general interface of the disk drive regarding whether the capacity and rotating speed of the other disk drives configuring the RAID group and the alternative disk drive are the same, this was determined based on information concerning the capacity or the like added to the software or hardware during the manufacture process of the disk drive with added cost, time and effort.

Nevertheless, when the disk drives configuring the RAID group become an old model and are no longer distributed in the market, the currently available disk drives must be used in the product. Here, large-capacity disk drives can be purchased at low cost due to the decease in the bit cost of disk drives, and fewer types of disk drives can be used to cover the lineup of disk drives operating under numerous types in order to reduce the storage control system costs. Here, even when the capacity and rotating speed of the disk drives configuring the RAID group and the alternative disk drives are different, there are cases where copy back is rendered unnecessary as a result of determining that the mutual disk drives are the same type of disk drive. In this kind of situation, the storage control system must be able to determine the characteristics of the respective disk drives not only based on the disk drive's primary capacity and rotating speed, but also based on its operational capacity and rotating speed. Nevertheless, such operational capacity and rotating speed are not defined under the Fibre Channel Protocol, SCSI or Serial ATA standards that support standard disk drives.

Thus, under the current circumstances, certain disk drives adopt original modes to retain the operational capacity with added cost.

In the disk array market where price competition is severe, it is necessary to use an interface of a disk drive of general standards, without adopting an original mode in the disk drive, for the storage control system to control the disk drive.

Thus, an object of the present invention is to provide a storage control system and a storage control method capable of determining the necessity of copy back based on the unique information of the alternative medium as a control function of the storage control system, particularly as the control function of the storage control system, by providing unique information to an alternative medium to become an alternative of a failed storage medium so that a storage control system will be able to recognize individual disk drives, which are handled independently by such storage control system, using an interface of a standard disk drive.

In order to achieve the foregoing object, the present invention adds unique information inherent to a storage medium including a logical type name to an alternative medium (spare disk drive) to become an alternative of a failed storage medium, and determines the necessity of copy back based on such unique information. Here, if the unique information including the logical type name is the same, the alternative medium will be recognized as having the same capacity and same rotating speed as the storage medium belonging to the RAID group.

In other words, the present invention provides a storage control system comprising a storage apparatus, and a controller for sending and receiving data between the storage apparatus and a host system. The storage apparatus includes a plurality of storage mediums mutually configuring a RAID group, a spare medium for saving stored information of a storage medium subject to a failure among the plurality of storage mediums, and an alternative medium to become an alternative of the failed storage medium. The controller executes, based on a control program, a first step of detecting a failure in the storage medium, a second step of recovering stored information of the failed storage medium based on stored information of another storage medium configuring the RAID group, and copying this to the spare medium, and a third step of reading unique information of the alternative medium, and determining whether to copy back stored information of the spare medium to the alternative medium based on the read unique information.

Preferable modes of the present invention include the following. The unique information of the alternative medium includes a logical type name relating to the specification of the plurality of storage mediums, and the controller is configured to determine the necessity of the copy back depending on whether the logical type name belonging to the unique information of the alternative medium is the same as the logical type name of the storage medium. The unique information of the alternative medium includes a logical type name relating to the specification of the plurality of storage mediums, and the controller is configured to determine that the copy back is unnecessary when the logical type name belonging to the unique information of the alternative medium is the same as the logical type name of the storage medium, and otherwise determine that the copy back is necessary. The unique information of the alternative medium includes the rotating speed and capacity relating to the specification of the plurality of storage mediums, and the controller is configured to determine the necessity of the copy back depending on whether the rotating speed and capacity belonging to the unique information of the alternative medium are the same as the rotating speed and capacity of the storage medium. The unique information of the alternative medium includes the rotating speed and capacity relating to the specification of the plurality of storage mediums, and the controller is configured to determine that the copy back is unnecessary when the rotating speed and capacity belonging to the unique information of the alternative medium are the same as the rotating speed and capacity of the storage medium, and otherwise determine that the copy back is necessary.

The present invention further provides storage control system comprising a channel controller for controlling an I/O request to a storage apparatus in response to a data I/O request from a host system, a disk controller for controlling the I/O request of the data with the storage apparatus, a shared memory for storing control information, a cache memory for temporarily storing control data, a disk storage apparatus as the storage apparatus to be connected to the disk controller, and a connection for mutually connecting the channel controller, the disk controller, the shared memory, and the cache memory. The disk storage apparatus includes a plurality of disk drives configuring a RAID group, a spare disk drive for saving stored information of a disk drive subject to a failure among the plurality of disk drives, and an alternative disk drive to become an alternative of the failed disk drive. The shared memory includes a storage area storing information for mapping another disk drive of the RAID group to which the failed disk drive belongs to the spare disk drive. The alternative disk drive includes media for storing unique information. The disk controller is configured to recover stored information of the failed disk drive based on stored information of other disk drives configuring the RAID group, and copy this to the spare medium, and determine whether to copy back stored information of the spare disk drive to the alternative disk drive based on the unique information stored in the media of the alternative disk drive. The media storing unique information corresponds to the area in which the disk drive stores user data.

Preferable modes of the present invention include the following. The unique information stored in the media of the alternative disk drive includes the rotating speed and capacity as with the disk drives configuring the RAID group, and the disk controller is configured to determine that the copy back is unnecessary when the rotating speed and capacity belonging to the unique information stored in the media of the alternative disk drive are the same as the rotating speed and capacity of the disk drives configuring the RAID group, and otherwise determine that the copy back is necessary.

According to the present invention, by determining the unique information of the alternative medium, the storage control system is able to individually recognize the type of each disk drive with an interface of a standard disk drive, and thereby control the respective disk drives. As a specific example of the control function, it is possible to provide a storage control system and a storage control method capable of using unique information of each disk drive to reliably determine the necessity of performing copy back.

Further, the foregoing control is enabled commonly to various types of disk drives with different data transfer protocols (Fiber Channel, S-ATA, SCSI, SAS, etc.). This is effective in reducing costs of the disk array apparatus.

DESCRIPTION OF DRAWINGS

FIG. 17 is a flowchart explaining the processing upon executing a read command or a write command to a plurality of disk drives in the same RAID group.

DETAILED DESCRIPTION

Figure 1:
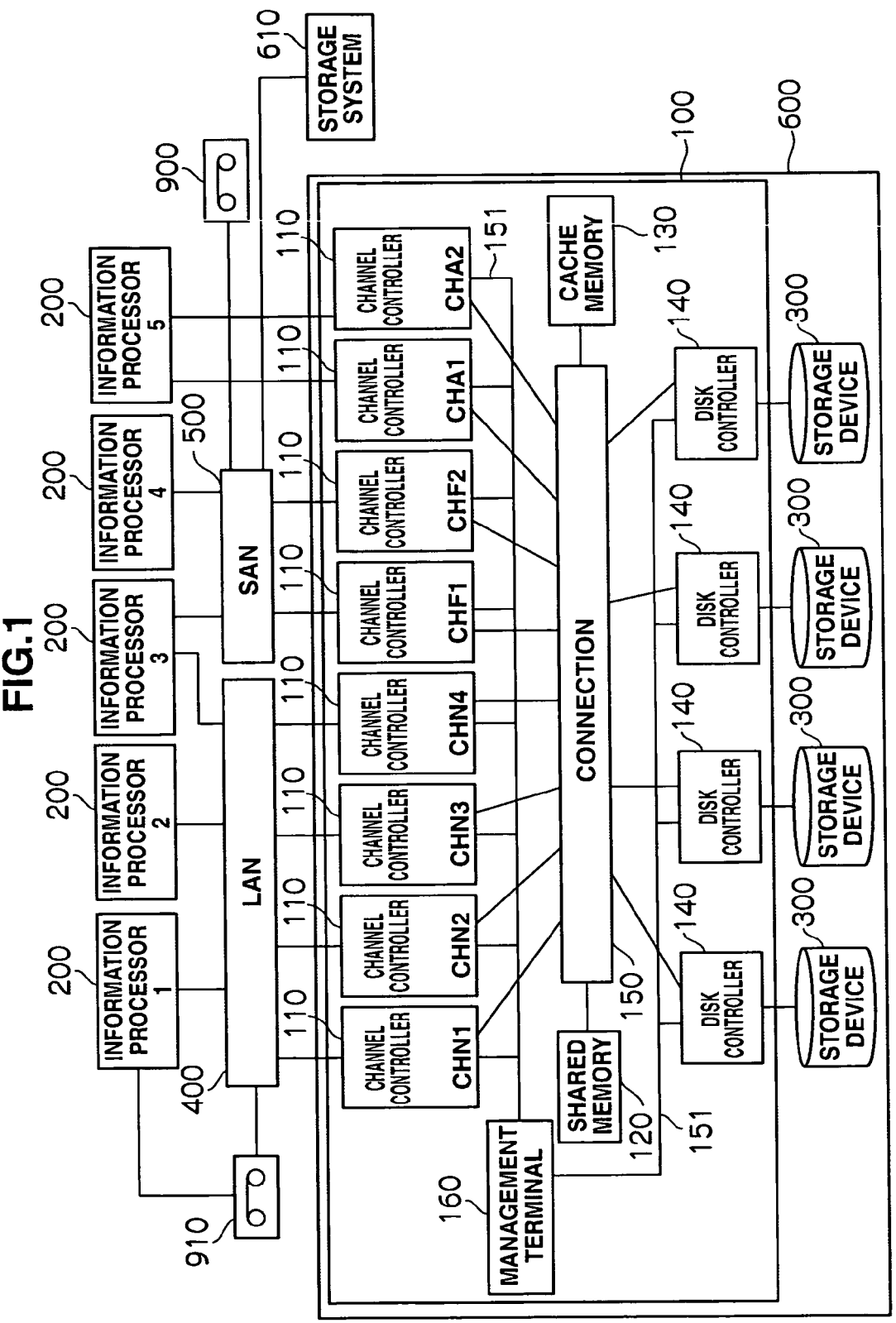
FIG. 1 is a configuration diagram of a storage system according to an embodiment of the present invention.

Embodiments of the present invention are now explained with reference to the attached drawings. FIG. 1 is a diagram showing the block configuration of a storage system (storage control system) 600 to which an embodiment of the present invention is applied.

The storage system 600 comprises a plurality of storage devices 300, and a storage device controller 100 for performing I/O control to the storage device 300 in response to an I/O request from an information processor (host system) 200.

The information processor 200 is a computer device comprising a CPU (Central Processing Unit), a memory and the like, and, for instance, is configured from a workstation, a mainframe computer, a personal computer or the like. The information processor 200 may also be configured by network-connecting a plurality of computers. The information processor 200 is loaded with application programs that run on the operating system. As application programs, for instance, there is an ATM system of banks and a seat reservation system of airline companies.

The information processors 1 to 3 (200) are connected to the storage system 600 via a LAN (Local Area Network) 400. The LAN 400 is a communication network such as Ethernet (registered trademark) or FDDI (Fiber Distributed Data Interface), and communication between the information processors 1 to 3 (200) and the storage system 600 is conducted according to a TCP/IP (Transmission Control Protocol/Internet Protocol) protocol.

A data access request (data I/O request in file units; hereinafter referred to as a "file request") based on file name designation to the storage system 600 is sent from the information processors 1 to 3 (200) to the channel controllers CHN 1 to CHN 4 (110) described later.

A backup device 900 is connected to the LAN 400. The backup device 910, for instance, is disk device such as an MO (Magneto Optics), a CD-R (Compact Disc Recordable), or a DVD-RAM (Digital Versatile Random Disc Access Memory), or a tape device such as a DAT (Digital Audio Tape recorder) tape, a cassette tape, an open tape, or a cartridge tape.

The backup device 910 stores the backup data of data stored in the storage device 300 by communicating with the storage device controller 100 via the LAN 400. Further, the backup device 910 is connected to the information processor 1 (200), and acquires the backup of data stored in the storage apparatus 300 via the information processor 1 (200).

The storage device controller 100 comprises channel controllers CHN 1 to 4 (110). The storage device controller 100 mediates the write access or read access among the information processors 1 to 3 (200) and the backup device 910 and the storage device 300 via the channel controllers CHN 1 to 4 (110) and the LAN 400. The channel controllers CHN 1 to 4 (110) individually receive a file access request from the information processors 1 to 3 (200). In other words, the channel controllers CHN 1 to 4 (110) are respectively allocated with a network address (for instance, an IP address) on the LAN 400, independently function as a NAS (Network Attached Storage), and each channel adapter 110 is able to provide service as a NAS to the information processors 1 to 3 (200) as though it is an independent NAS.

Like this, by adopting a configuration of providing the channel controllers CHN 1 to 4 (110), which independently provide service as a NAS, to one storage system 600, NAS servers that were conventionally operated separately with independent computers can be integrated into one storage system 600. This enables the comprehensive management of the storage system 600, and maintenance work such as various settings and controls, failure management and version management can be streamlined.

The information processor 3 and 4 (200) are connected to the storage device controller 100 via a SAN (Storage Area Network) 500. The SAN 500 is a network for transferring data between the information processors 3 and 4 (200) in block units as the management unit of data in the storage areas provided by the storage device 300.

Communication between the information processors 3 and 4 (200) and the storage device controller 100 via the SAN 500 is generally conducted according to a fibre channel protocol. A data access (hereinafter referred to as a "block access request") in block units is sent from the information processors 3 and 4 (200) to the storage system 600 according to the fibre channel protocol.

A SAN-compatible backup device 900 is connected to the SAN 500. The SAN-compatible backup device 900 stores backup data of data stored in the storage device 300 by communicating with the storage device controller 100 via the SAN 500.

The storage device controller 100, in addition to the channel controllers CHN 1 to 4 (110), further comprises channel controllers CHF 1 and 2 (110). The storage device controller 100 conducts the communication between the information processors 3 and 4 (200) and the SAN-compatible backup device 900 via the channel controllers CHF 1 and 2 (110) and the SAN 500.

The information processor 5 (200) is additionally connected to the storage device controller 100 without going through a network such as the LAN 400 or SAN 500. An example of this kind of information processor 5 (200), for instance, is a mainframe computer. Communication between the information processor 5 (200) and the storage device controller 100 is conducted, for example, according to communication protocols such as FICON (Fiber Connection) (registered trademark) or ESCON (Enterprise System Connection) (registered trademark), ACONARC (Advanced Connection Architecture) (registered trademark), FIBARC (Fiber Connection Architecture) (registered trademark) or the like. A block access request is communicated from the information processor 5 (200) to the storage system 600 according to the foregoing communication protocols.

The storage device controller 100 communicates with the information processor 5 (200) through the channel controllers CHA 1 and 2 (110).

Incidentally, the SAN 500 may also be connected to another storage system 610 installed at a location (secondary site) that is remote from the installation site (primary site) of the storage system 600.

The storage system 610 is used as an apparatus of the replication source of data in the replication or remote copy function. Further, the storage system 610 may also be connected to the storage system 600 through a communication line such as an ATM (Asynchronous Transfer Mode) in addition to the SAN 500. Here, for instance, a channel adapter comprising an interface (channel extender) for using the foregoing communication line is adopted as the channel controller 110 to be connected to the SAN 500.

Like this, as a result of mixing and mounting the channel controllers CHN 1 to 4 (110), the channel controllers CHF 1 and 2 (110), and the channel controllers CHA 1 and 2 (110) in the storage system 600, a storage system capable of connecting to different networks is realized. In other words, this storage system 600 becomes a SAN-NAS-integrated storage system when connecting to the LAN 400 using the channel controller CHN 1 to 4 (110), and connected to the SAN 500 using the channel controllers CHF 1 and 2 (110).

The connection 150 mutually connects the respective channel controllers 110, the shared memory 120, the cache memory 130, and the respective disk controllers 140. The mutual transfer of commands and data among the channel controllers 110, the shared memory 120, the cache memory 130, and the disk controllers 140 is conducted via the connection 150. The connection 150, for instance, is configured from a high-speed bus such as an ultra high-speed crossbar switch that performs data transfer based on high-speed switching. Thereby, in addition to being able to significantly improve the communication performance between the channel controllers 110, it will also be possible to realize a high-speed file shared function or high-speed failover.

The shared memory 120 and the cache memory 130 are memory devices to be shared by the channel controllers 110 and the disk controllers 140. The shared memory 120 is primarily used for storing control information including commands, and the cache memory 130 is primarily used for storing data. For example, when a data I/O command that a certain channel controller 110 received from the information processor 200 is a write command, such channel controller 110 writes the write command into the shared memory 120, and writes the write data received from the information processor 200 into the cache memory 130.

The disk controllers 140 are monitoring the shared memory 120, and, when they determine that a write command has been written into the shared memory 120, the read the write data from the cache memory according to the write command and write this into the storage device 300.

Meanwhile, when a data I/O command that a certain channel controller 110 received from the information processor 200 is a read command, such channel controller 110 writes the read command into the shared memory 120, and checks whether data to be read exists in the cache memory 130. Here, when data to be read exists in the cache memory 130, the channel controller 110 reads such data from the cache memory 130 and sends it to the information processor 200.

When data to be read does not exist in the cache memory 130, the disk controller 140 that detected that a read command has been written into the shared memory 120 reads the data to be read from the storage device 300 and writes it into the cache memory 130, and also writes to such effect into the shared memory 120.

When the channel controller 110 detects that data to be read has been written into the cache memory 130 as a result of monitoring the shared memory 120, the channel controller 110 reads such data from the cache memory 130 and sends it to the information processor 200.

The disk controller 140 converts the data access request to the storage device based on a logical address designation sent from the channel controller 110 into a data access request based on a physical address designation, and writes or reads data into or from the storage device 300 in response to the I/O (Input/Output) request output from the channel controller 110.

Since the storage device 300 is of a RAID configuration, the disk controllers 140 access data according to the RAID configuration. In addition, the disk controllers 140 perform replication control or remote copy control for the replication management or backup control of data stored in the storage device 300, and for preventing the loss of data (disaster recovery) during the occurrence of a disaster.

The storage device 300 comprises disk drives (physical volumes) corresponding to one or more storage mediums, and provides storage areas that are accessible from the information processor 200. For example, the disk controllers 140 comprise a plurality of ports, and the individual disk drives are connected to each port. The storage areas provided by the storage device 300 are set with logical volumes in which storage spaces of one or more physical volumes are combined. The logical volumes set in the storage device 300 include user logical volumes accessible from the information processor 200, and system volumes to be used by the channel controller 110 for performing control. The system logical volume also stores an operating system to be executed by the channel controllers 110.

Figure 2:
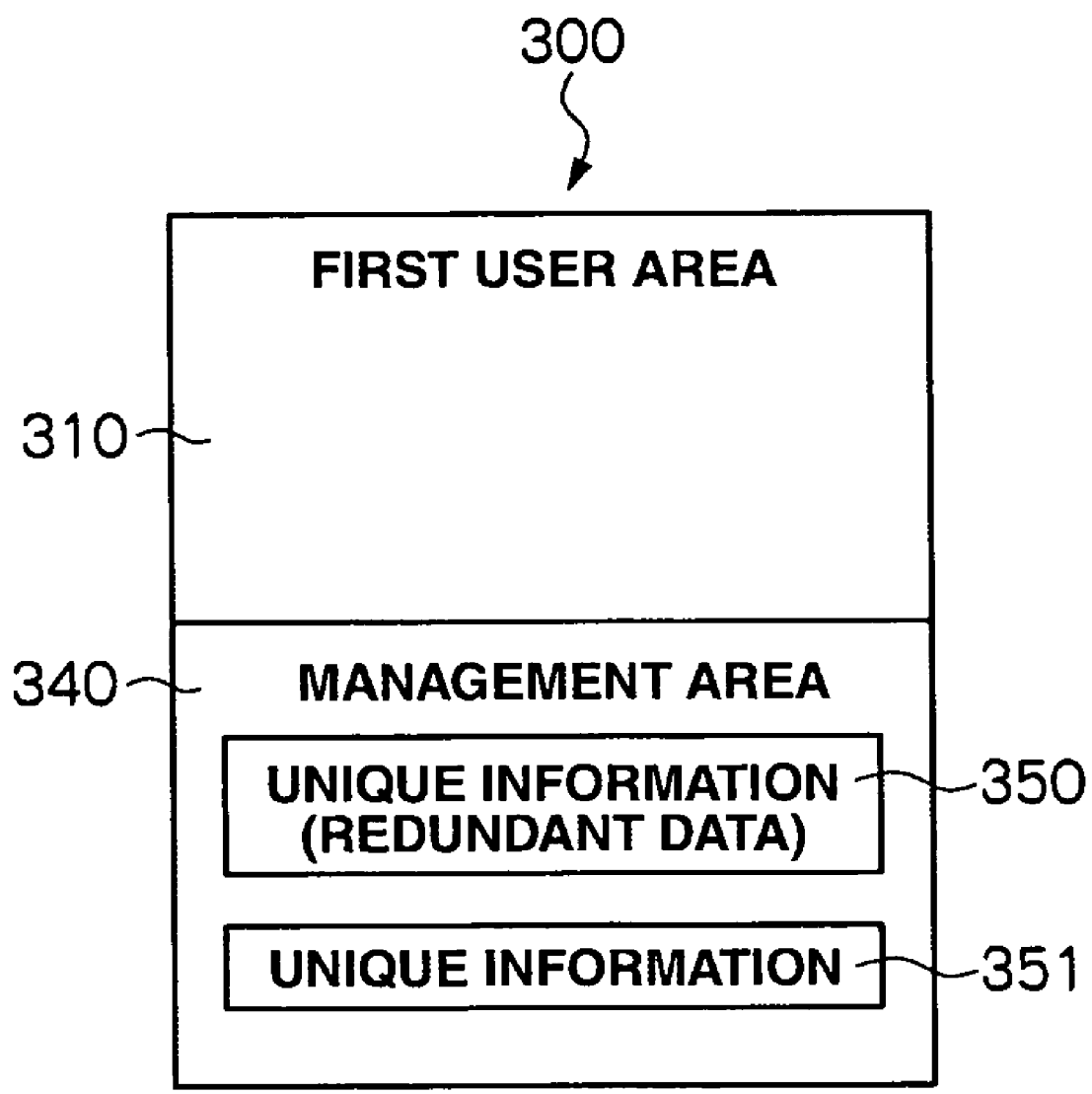
FIG. 2 is a diagram showing the configuration of a user data area and a management area of a disk drive.

Further, a user data area 310 and a management area 340 as shown in FIG. 2 are set as areas for storing unique information inherent to the storage medium including a logical type name to a media of an alternative disk drive to become an alternative of a failed storage device 300 among the storage devices (300) (disk drives).

Figure 3:
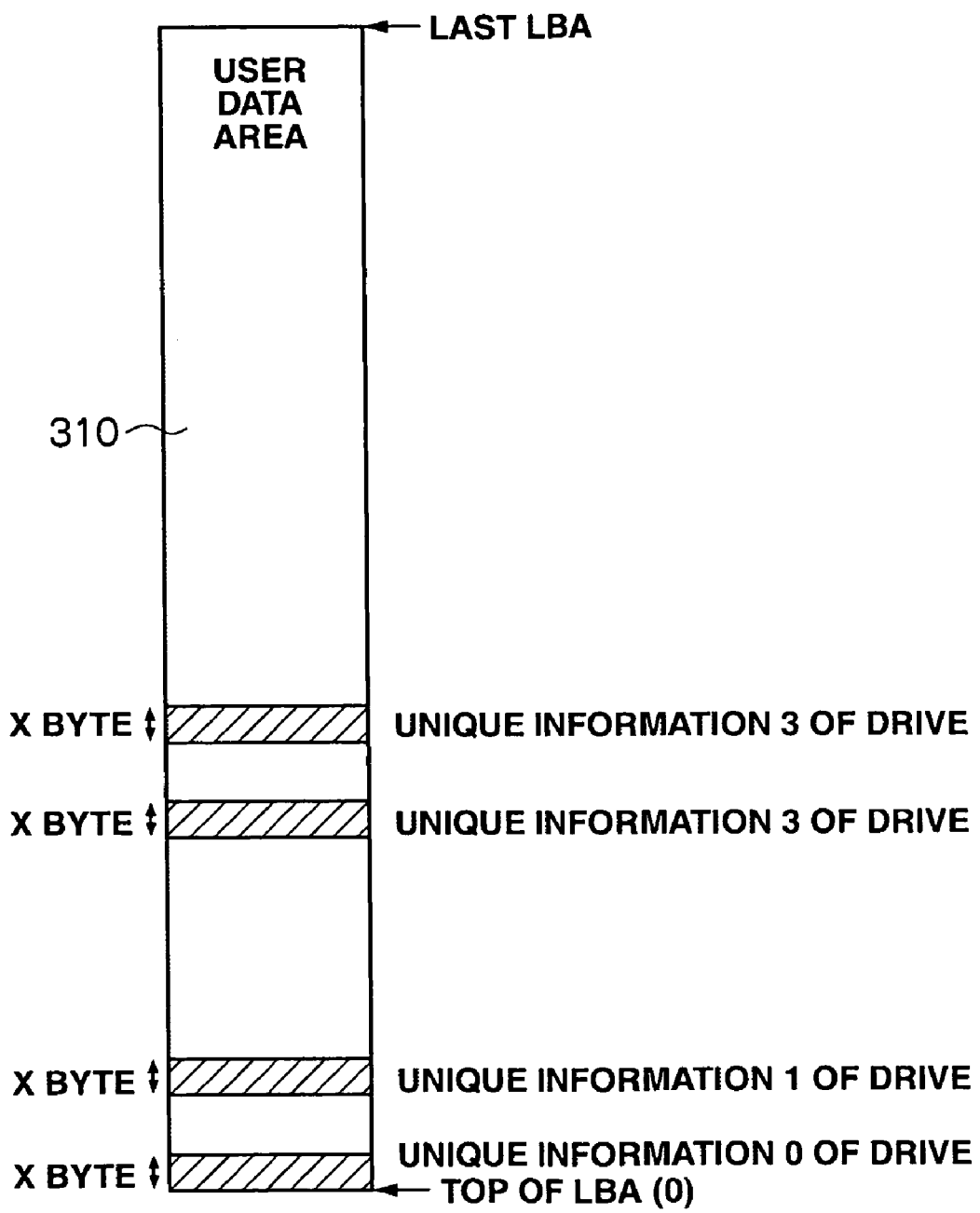
FIG. 3 is a diagram explaining the configuration of the user data area of the disk drive.
Figure 4:
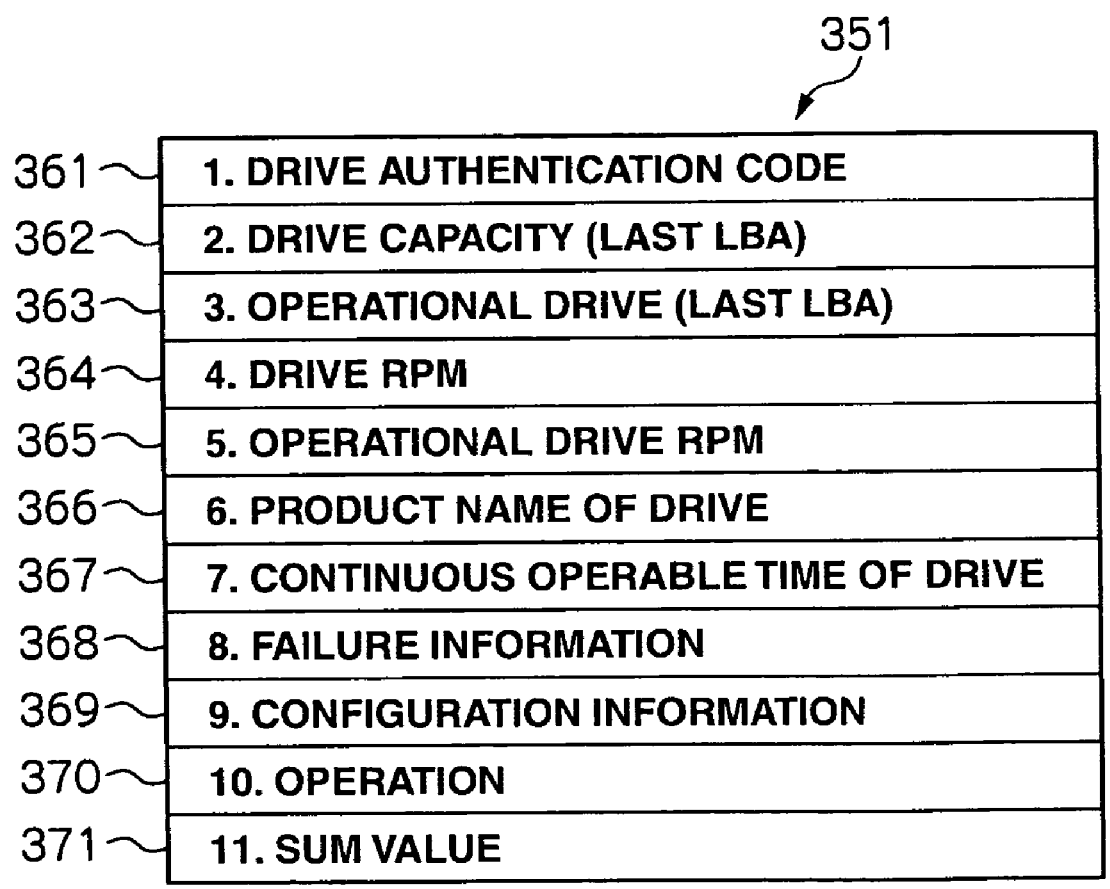
FIG. 4 is a diagram explaining the configuration of unique information of the disk drive.

The management area 340, as shown in FIG. 3, respectively stores X-byte worth of unique information 320, 321, 322, 323 of disk drives between the top LBA (logical block address) and LAST LBA of the management area when the redundancy of unique information of disk drives is set to 4.

Further, the management area 340 stores unique information 350, 351 containing redundant data featured for this explanation. The unique information 351 is set with field 361 to 371 of #1 to #11. The #1 field 361 stores a drive authentication code, for instance, a code for confirming that the mounted disk drive is a disk drive that has already been tested in the production line at the time of booting RAID, and becomes an index in determining whether the disk drive can be used in the disk array apparatus according to the product specification.

The #2 field 362 stores the drive capacity (LAST LBA), the #3 field 363 stores the operational drive capacity (LAST LBA), the #4 field 364 stores the drive rotating speed, the #5 field 365 stores the operational drive rotating speed, the #6 field 366 stores the drive product name, the #7 field 367 stores the continuous operable time of drive, the #8 field 368 stores failure information, the #9 field 369 stores configuration information, the #10 field 370 stores operation history, and the #11 field 371 stores the SUM value.

The #1 field 361, the #3 field 363, the #5 field 365, the #6 field 366, and the #7 field 367 are information that cannot be acquired with a standard interface of a disk drive, and are individual identifying information of the disk drives showing the type of disk drives in the disk array apparatus.

Further, the logical volumes provided by the storage device 300 are allocated with logical volumes that are accessible from the respective channel controllers 110. In addition, a plurality of channel controllers 110 may share the same logical volume.

The management terminal 160 is a computer device for maintaining and managing the storage system 600, and is connected to the respective channels controller 110 and the disk controllers 140 through an internal LAN 151. An operator (maintenance staff) operates the management terminal (SVP; service processor) 160 to set the disk drives and logical volumes of the storage device 300, and install micro programs to be executed by the channel controllers 110 or the disk controllers 140. The management terminal 160 may also be connected to the controllers via a network.

Figure 5:
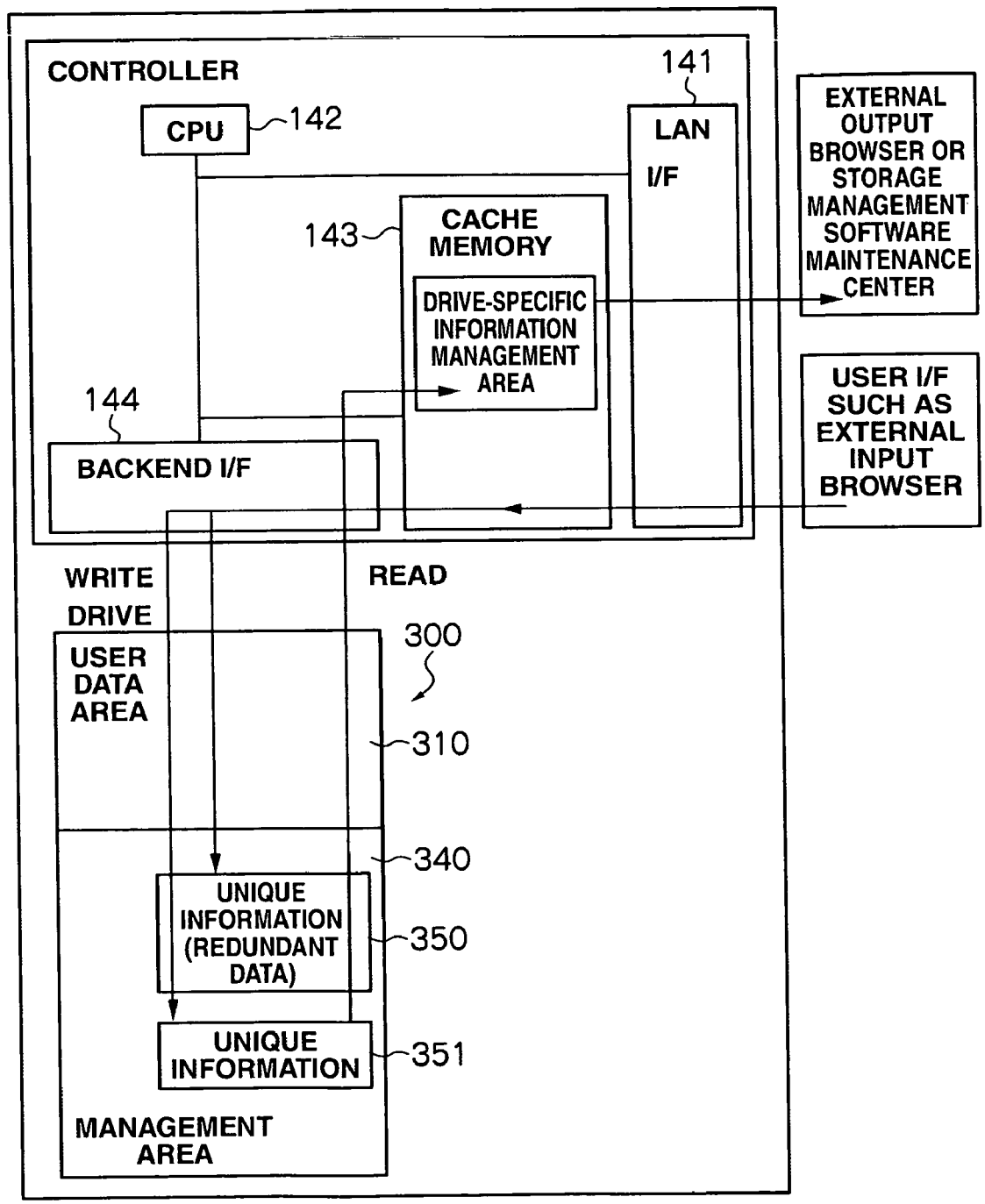
FIG. 5 is a configuration diagram of a disk array apparatus according to an embodiment of the present invention.

FIG. 5 shows the circuit configuration of the disk array apparatus including the disk controller 140 and the storage device 300. The disk controller 140 comprises a LAN interface unit (LAN I/F) 141, a microprocessor (MP or CPU) 142, a cache memory 143 storing management information and the like for managing drive-specific information, and a back-end interface 144, and these components are formed integrally as a unit on one or more circuit boards.

The controller comprising the LAN interface unit 141, the microprocessor (MPU or CPU) 142 and the back-end I/F 144 comprises an interface for communicating with the channel controllers 110 and the like via the connection 150, the back-end interface unit 144 comprises storage device 300, and the LAN interface unit 141 comprises a communication interface for communicating with a browser or the management terminal 160.

The microprocessor (or CPU) 142 communicates with the channel controllers 110, the storage device 300 and the management terminal 160 to prevent unauthorized access control to the storage device 300 and unauthorized use of data, reads the unique information 351 of the alternative disk drive among the storage devices 300, determines the availability of the disk drive based on the authentication code of the read unique information 351, sends data to the storage management software or management terminal disk drive so as to display the product name of the unique information thereon, or determines the necessity of copy back based on the capacity and rotating speed of the unique information of the disk drive or the operational type name according to the product specification.

Further, the microprocessor (or CPU) 142 comprises a function of writing unique information of the disk drive input from a user interface such as a browser into the management area 340 of the alternative disk drive, and notifying the product name, failure information, configuration information and operational history of the failed disk drive to the management terminal 160.

Figure 6:
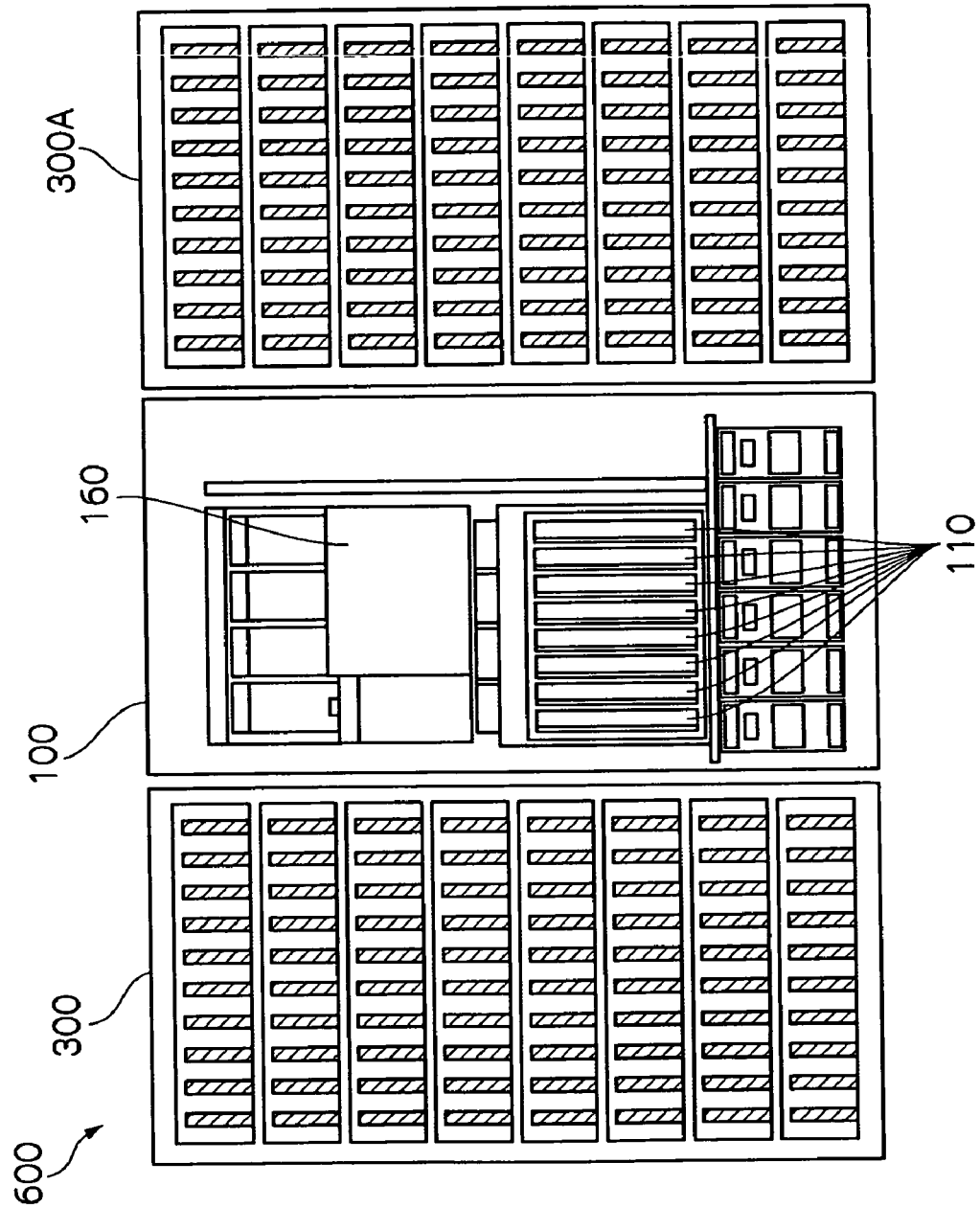
FIG. 6 is a schematic configuration diagram of the storage system according to an embodiment of the present invention.
Figure 7:
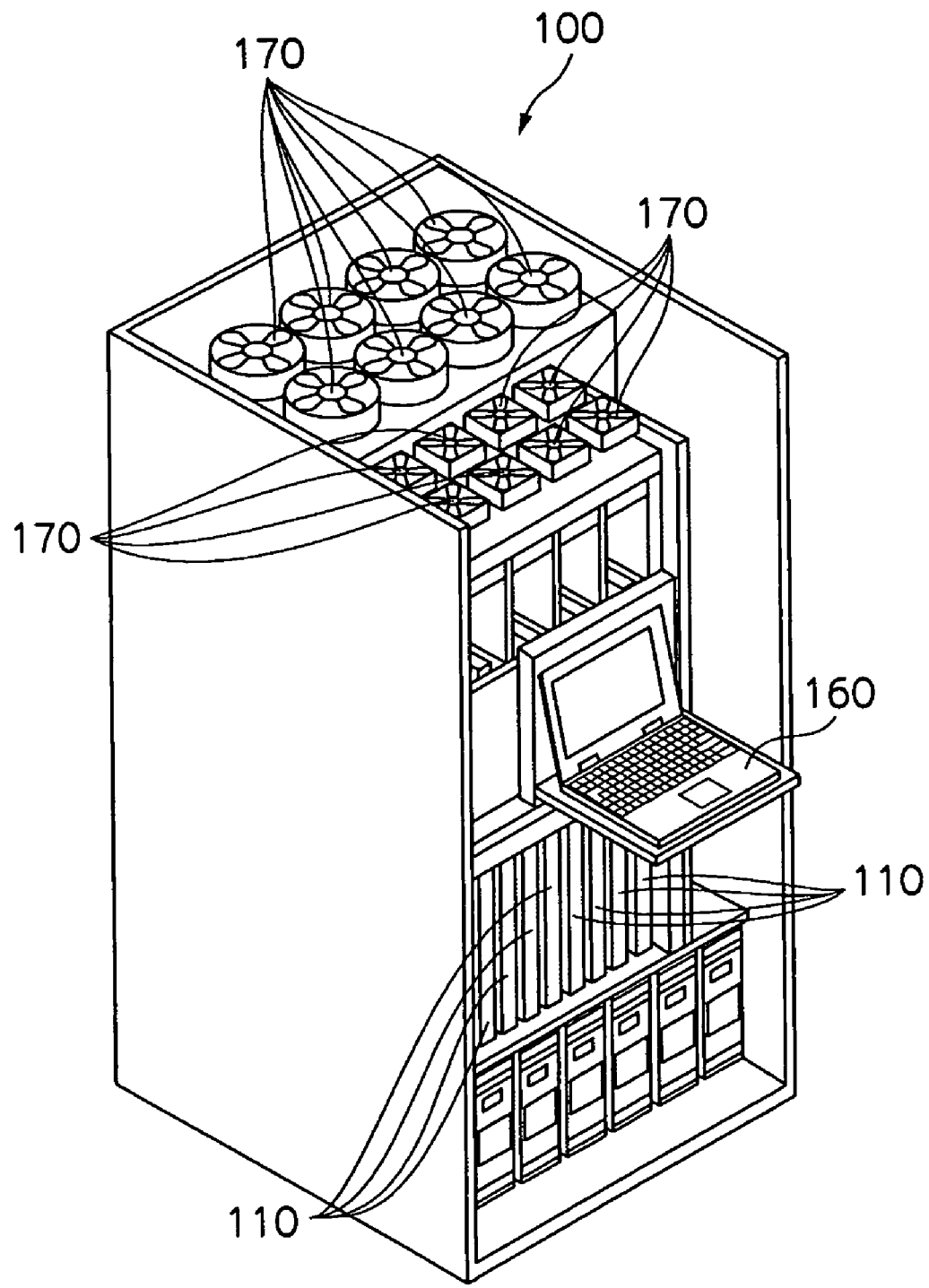
FIG. 7 is a schematic configuration diagram of the storage system according to an embodiment of the present invention.

FIG. 6 and FIG. 7 show the schematic configuration of the storage system 600. As shown in FIG. 6, the storage system 600 is configured by the storage controller 100, and a chassis 300A of the storage apparatus mounted with a plurality of storage devices 300 being respectively housed in their chassis. The chassis 300A is disposed at either side of the chassis of the storage device controller 100.

The storage device controller 100 is provided with a management terminal 160 at the front center portion thereof. The management terminal 160 is covered with a cover, and, as shown in FIG. 7, the management terminal 160 can be used by opening the cover. Here, although the management terminal 160 is in the shape of a so-called laptop personal computer, any type of computer device may be used.

The storage device controller 100 is provided with fans 170 for discharging heat arising from the board of the channel controllers 110. The fans 170 are provided at the upper face of the storage device controller 100, as well as to the upper part of the slots for the channel controllers 110.

Slots are provided at the lower part of the management terminal 160 for mounting the respective boards of the channel controllers 110, the disk controllers 140, the cache memory 130, and the shared memory 120. A board is a unit on which a circuit board is formed, and is a unit for counting the installation into the slot. With the storage system 600 according to this embodiment, a plurality of slots are provided, and FIG. 6 and FIG. 7 show a state where the respective boards are mounted on a plurality of slots.

Each slot is provided with a guide rail for installing the board. By inserting the board into the slot along this guide rail, the respective boards can be mounted on the storage device controller 100.

Further, the boards installed in the respective slots can be removed by being pulled forward along the guide rail. Further, a connector for electrically connecting the board to the storage device 100 is provided to the front part in the dept direction of the slot.

Figure 8:
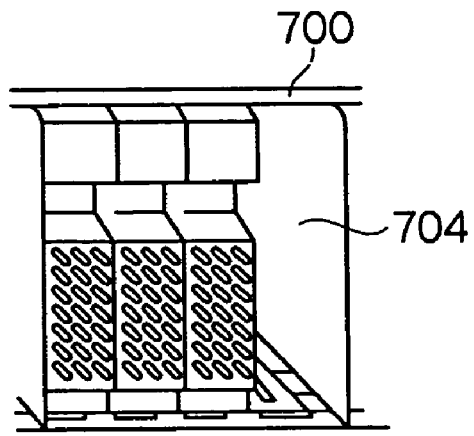
FIG. 8(1) is a perspective view showing the status of a plurality of hard disk drives being inserted into a slot of a chassis, FIG. 8(2) is a perspective view of a single hard disk drive, and FIG. 8(3) is a front view of a single hard disk drive.
Figure 8:
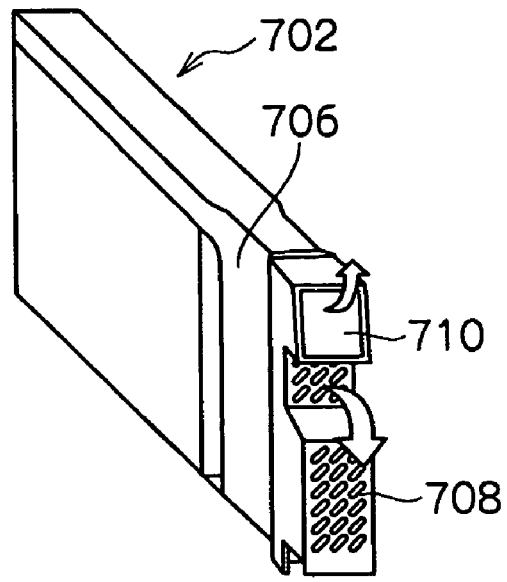
Figure 8:
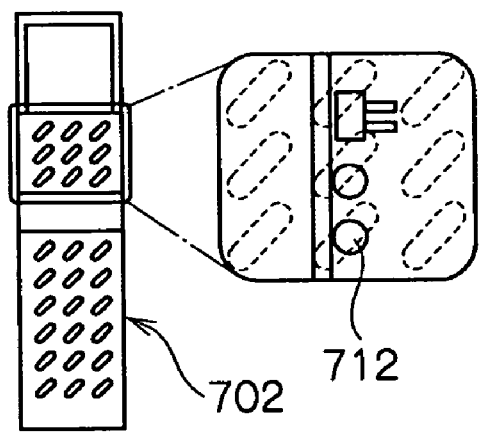

FIG. 8 shows a state where a plurality of hard disk drive boards 700 are inserted into the slot 700 on the back face of the chassis. Reference numeral 704 is an insertion area of the hard disk drive boards in a state where the defective drive has been removed from the slot. The hard disk board is configured from a board body 706 and a handle 708 fixed to the front face thereof. When a stopper 710 that cannot be viewed from the front face is disengaged, and the maintenance staff pulls the handle 708 forward toward the maintenance staff, this board can be removed from the slot. Further, by the maintenance staff holding the handle portion and pushing the board into the slot and thereafter setting the stopper 710, the board can thereby be inserted into the slot. The front face of the board is provided with a shutdown LED 712. This illuminates when the disk controller 140 indicates the replacement of the board. The maintenance staff will know that the illuminated board must be replaced.

The disk controllers 140 further block the I/O with the defective board. This is referred to as logically blocking the board. Although the defective board can be substituted with a spare board, if the hard disk board is not replaced, the I/O load of the other boards will increase, and it is desirable that the defective board is replaced quickly. When the board is replaced, the disk adapters recognize the logical volume of this board and continue the processing of storage control.

Each of the hard disk drives configuring the storage device of FIG. 1, as with the channel controllers 110, is configured as a board including a peripheral circuit and a hard disk and a drive unit. This board can be inserted into the slot of the chassis 300A. When the hard disk drive is subject to a failure, the failed hard disk drive is replaced with another hard disk drive. When the board of the hard disk drive is inserted into the slot of the chassis, this board will be electrically connected to the disk controllers 140.

Disk adapters, for instance, are provided to ports 0 to 4, and each port and one board of a storage device correspond to each other. A failure in the hard disk drive is diagnosed and detected by a microprocessor of the disk controller 140 for each board.

Figure 9:
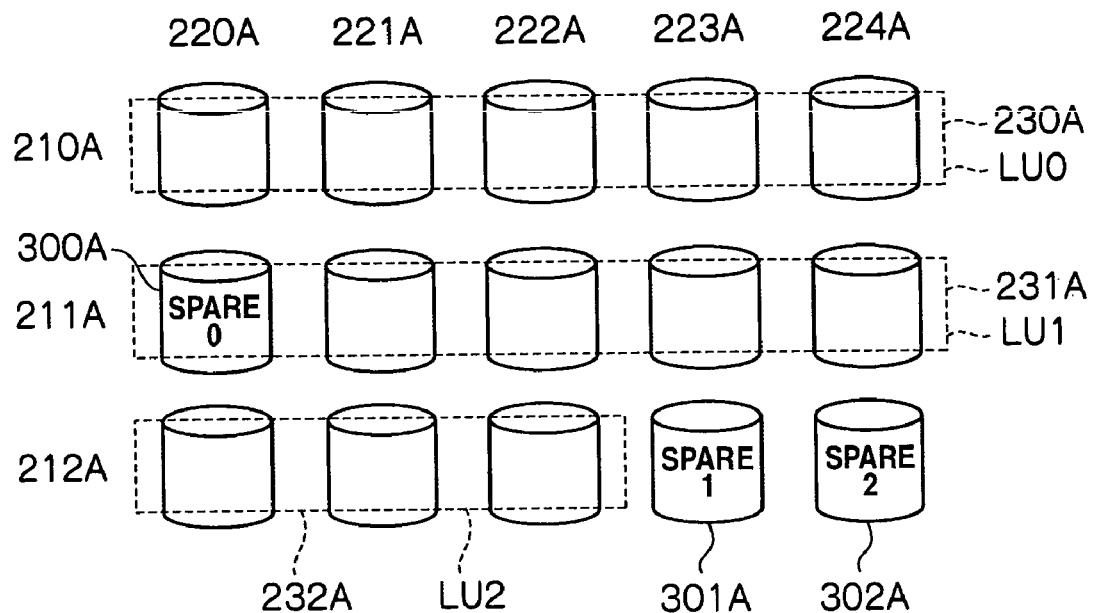
FIG. 9(1) and FIG. 9(2) are block diagrams showing an array configuration of the disk drives.
Figure 9:
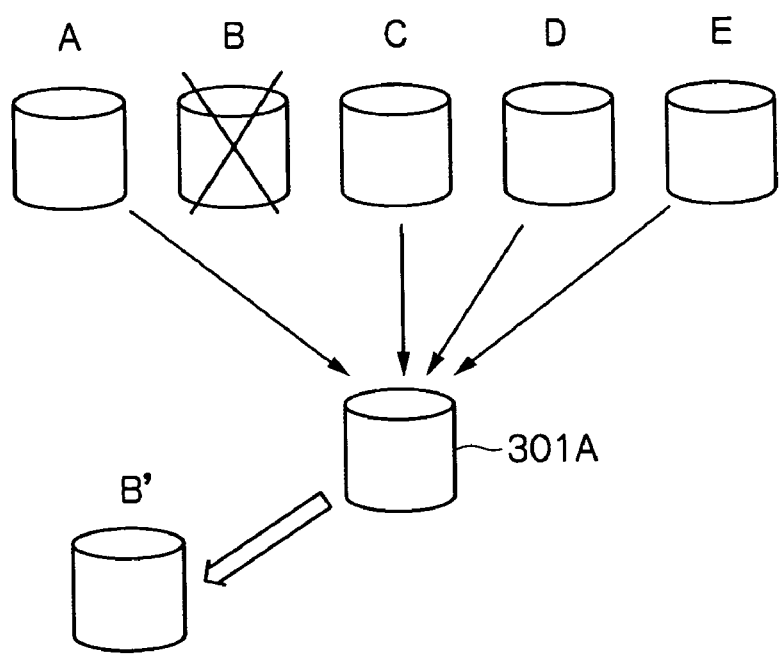

The RAID configuration of the storage device 300 is now explained with reference to FIG. 9. As shown in FIG. 9(1), the arrangement of the physical hierarchy (PDEV) of the disk drive is considered an array, the lateral direction is set as ROW (210A to 212A), the longitudinal direction is set as PORT (220A to 224A), and the logical volume configuration when the disk drive ROW (210A to 212A) connected to each disk controller 140 is made redundant based on a RAID 5 (striping with parity) mode is manages as LU (Logical Unit) 0-2 (logical unit). Incidentally, the present invention can also be applied to other RAID modes.

Several of the disk drives A are set as spare disk drives (300A, 301A) to be used as alternatives. This setting can be made from the management terminal 160 through a graphical user interface. In the example of FIG. 9, a case is shown where a failure occurred in a disk drive positioned at ROW 0 and PORT 1 configuring the logical volume LU0, data of this disk drive is recovered from the parity group of the remaining disk drives of the [logical volume] LU0, and copying such data to the spare disk drive 301A via correction copy. B' is the disk drive replaced with the failed disk drive B, and the stored contents of the spare disk drive 301A are returned (copied back) to the disk drive B'.

Here, a plurality of spare disk drives exist in the arrangement (array) of a physical storage hierarchy of disk drives. The micro program of the disk controller 140 reads the respective locations of the disk drives (A-E) configuring the parity group of the logical volume LU0 containing the failed disk, and the location of the available spare disk drive in the array arrangement from the shared memory 140, creates a table (mapping table) for mapping the optimal spare disk drive to the disk drive of the parity group requiring failure recovery, and stores this in a prescribed area of the shared memory 140.

The disk controller 140 refers to this table and recovers the data of the failed disk drive from the other disk drives of the RAID group to which the failed disk drive belongs, and copies such data to the mapped spare disk drive via correction copy. Thereupon, the disk controller 140 determines whether to copy back the stored information of the spare disk drive to the alternative disk drive based on the logical type name relating to the specification of the disk drives configuring RAID according to unique information such as the capacity and rotating speed and production specification stored in the alternative disk drive to become the alternative of the failed disk drive.

Here, the disk controller 140 determines that copy back is unnecessary when the logical type name of the alternative disk drive is the same as the logical type name of the failed disk drive, and otherwise determines that copy back is necessary (in other words, when the logical type names are not the same). Specifically, the disk controller 140 determines that copy is unnecessary when the rotating speed and capacity belonging to the unique information of the alternative disk drive are the same as the rotating speed and capacity of the failed disk drive, and determines that copy back is necessary when they are different.

Figure 10:
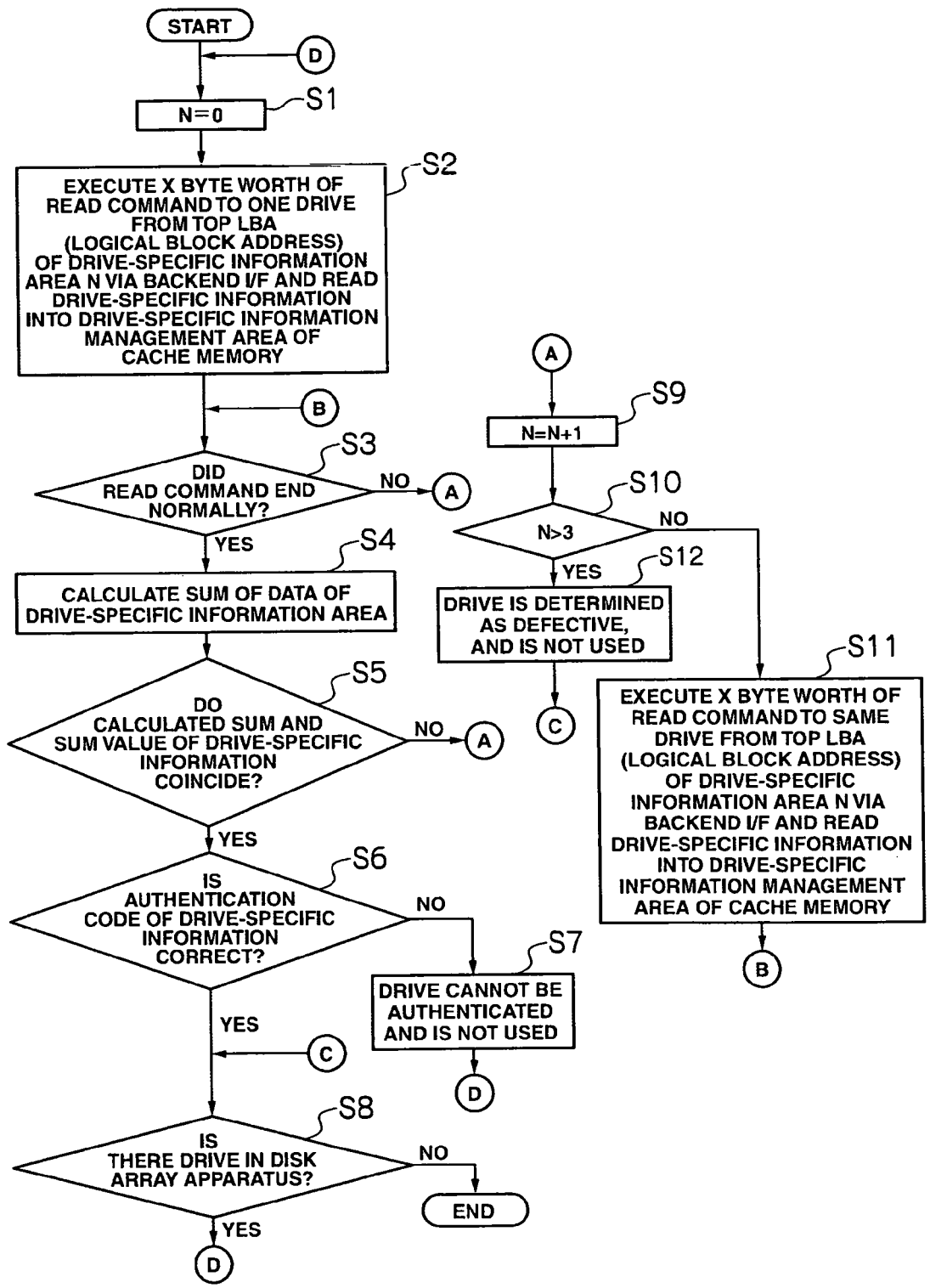
FIG. 10 is a flowchart explaining the operation upon authenticating a disk drive.

The operation of the disk controllers 140 configuring the disk array apparatus authenticating the disk drive is now explained with reference to the flowchart of FIG. 10. This sequential operation is realized by the microprocessor (or CPU) 142 of the disk controller 140 based on a micro program. Foremost, the disk controller 140 sets the number N corresponding to redundancy to 0 (S1), executes X-byte worth of read command from the top LBA of the user data area 340 of the disk drive to one disk drive; for instance, to the alternative disk drive, via the back-end interface unit 144, and reads the unique information of the disk drive and writes it into the drive-specific information management area of the cache memory 143 (S2). Subsequently, the disk controller 140 determines whether the read command ended normally (S3), and, when it ended normally, the disk controller 140 calculates the SUM of data stored in the management area 340 of the disk drive (S4), and determines whether the calculated SUM value and the SUM value stored in the management area 340 of the drive coincide (S5).

Subsequently, the disk controller 140 determines whether the authentication code of the unique information 320 of the disk drive is correct (S6), and, when it is incorrect, the disk controller 140 determines that the drive cannot be authenticated and prohibits the use of the unique information 320 of the disk drive (S7). Contrarily, when the authentication code is determined to be correct, the disk controller 140 determines whether there is any other disk drive in the disk array apparatus (S8), returns to the processing at step S1 to perform processing to the other disk drives once again when there is another disk drive, and ends this processing routine when there is no other disk drive. Further, it is possible to input and write unique information of the disk drive from the storage management software and the management terminal to the disk drive that cannot be authenticated, whereby these disk drives will also become available to the disk array apparatus.

Meanwhile, when the determination is NO at steps S3, S5, S6, the disk controller 140 sets the number N showing redundancy to +1 (S9), and determines whether N is greater than 3 (S10). When N is 1 and smaller than 3, the disk controller 140 reads the unique information 321 of the disk drive into the same disk drive and writes the contents thereof into the cache memory 143 (S11), returns to the processing at step S3, and repeats the processing at step S3 to S11 until N becomes 3.

Meanwhile, when it is determined that N is greater than 3 at step S10; in other words, when the redundancy is 4, since N will exceed the numerical value of redundancy when it is greater than 3, the disk controller 140 determines this disk drive as defective, and prohibits the use thereof (S12). The disk controller 140 then proceeds to the processing at step S8, and ends this processing routine.

Figure 11:
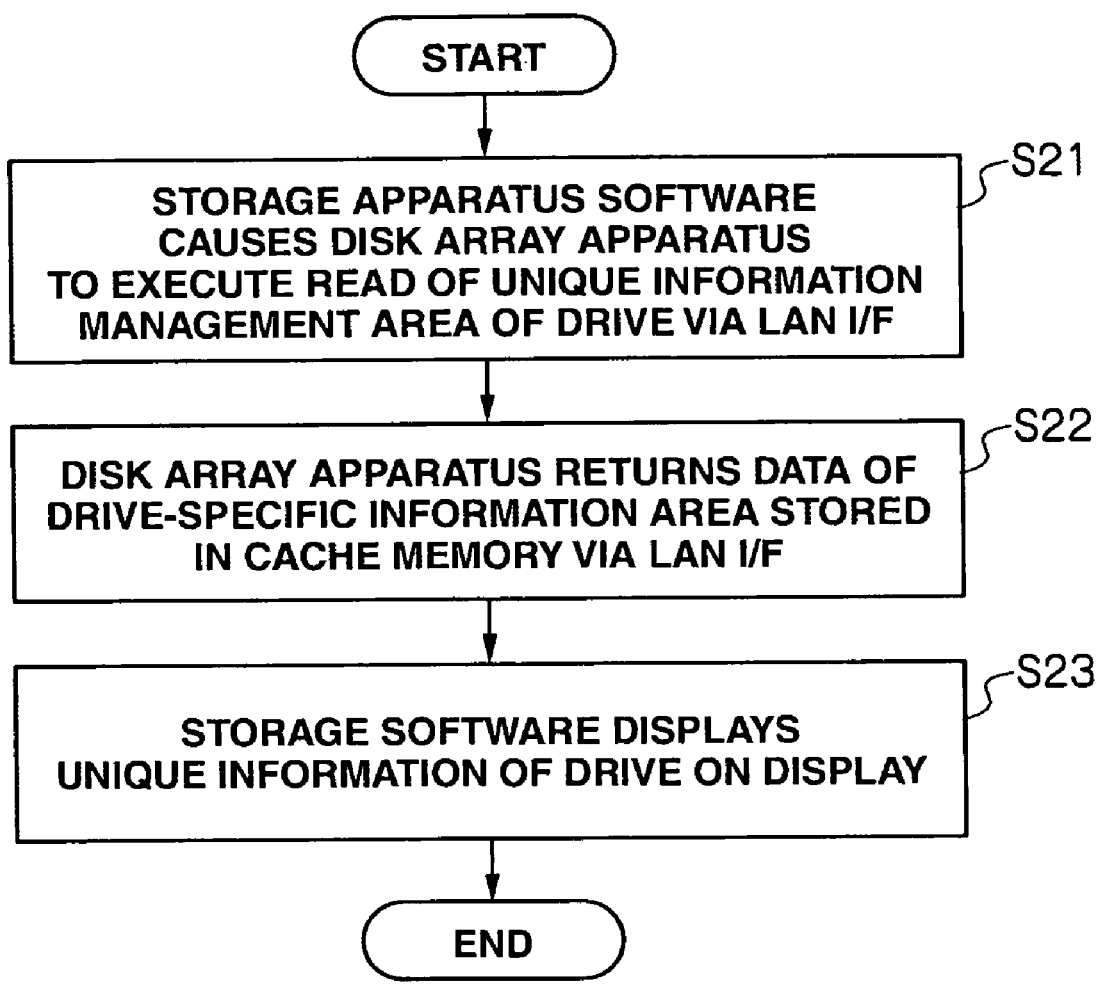
FIG. 11 is a flowchart explaining the processing upon displaying unique information of the disk drive with storage management software.

The operation of displaying the unique information of the disk drive on external storage management software is now explained with reference to the flowchart of FIG. 11. This sequential operation is realized based on the processing of the external storage management software and the microprocessor (or CPU) 142 of the disk controller 140.

Foremost, the external storage management software executes processing for the disk controller 140 to read information in the management area 340 of the disk drive via the interface unit (LAN I/F) 141 (S21). Here, the disk controller 140 returns the data stored in the drive-specific information management area of the cache memory 143 to the external storage management software via the interface unit 141. Thereby, the external storage management software displays the unique information of the disk drive based on the received data (S23), and then ends this processing routine. Thereby, it is possible to display the capacity and rotating speed of the disk drive as the unique information of the disk drives mounted on the disk controller (disk array apparatus) 140. Thus, when a disk drive fails, the user of maintenance staff will be able to confirm the type of disk drive from the contents (unique information) displayed on the display.

Figure 12:
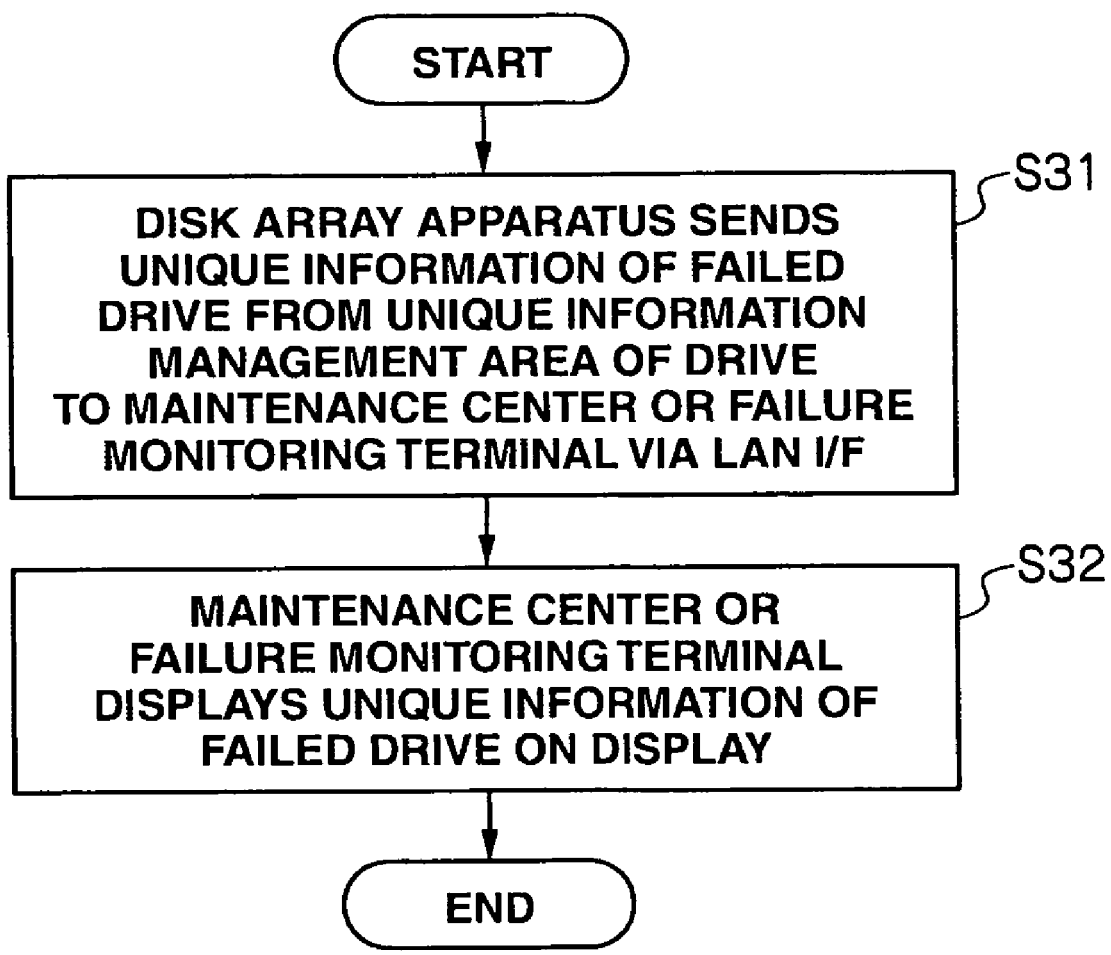
FIG. 12 is a flowchart explaining the processing upon notifying the unique information of a disk drive to a failure monitoring terminal of a maintenance center or a user when the disk drive malfunctions.

The operation of notifying the unique information of the disk drive to the maintenance center or the user's failure monitoring terminal when a failure occurs in the disk drive is now explained with reference to the flowchart of FIG. 12. This sequential operation is realized based on the processing by the maintenance center or the user's failure monitoring terminal and processing of the microprocessor 142 of the disk controller 140.

Foremost, the disk controller (disk array apparatus) 140 sends the unique information of the failed disk drive to the maintenance center or the user's failure monitoring terminal via the interface unit 141 based on the information stored in the drive-specific information management area of the cache memory 140 (S31). The maintenance center or the user's failure monitoring terminal that received the information from the disk controller 140 displays the unique information of the failed disk drive on the display (S32), and then ends this processing routine. Thereby, when the disk drive fails, it is possible to notify the unique information of the failed disk drive to the maintenance center or the user's failure monitoring terminal.

Figure 13:
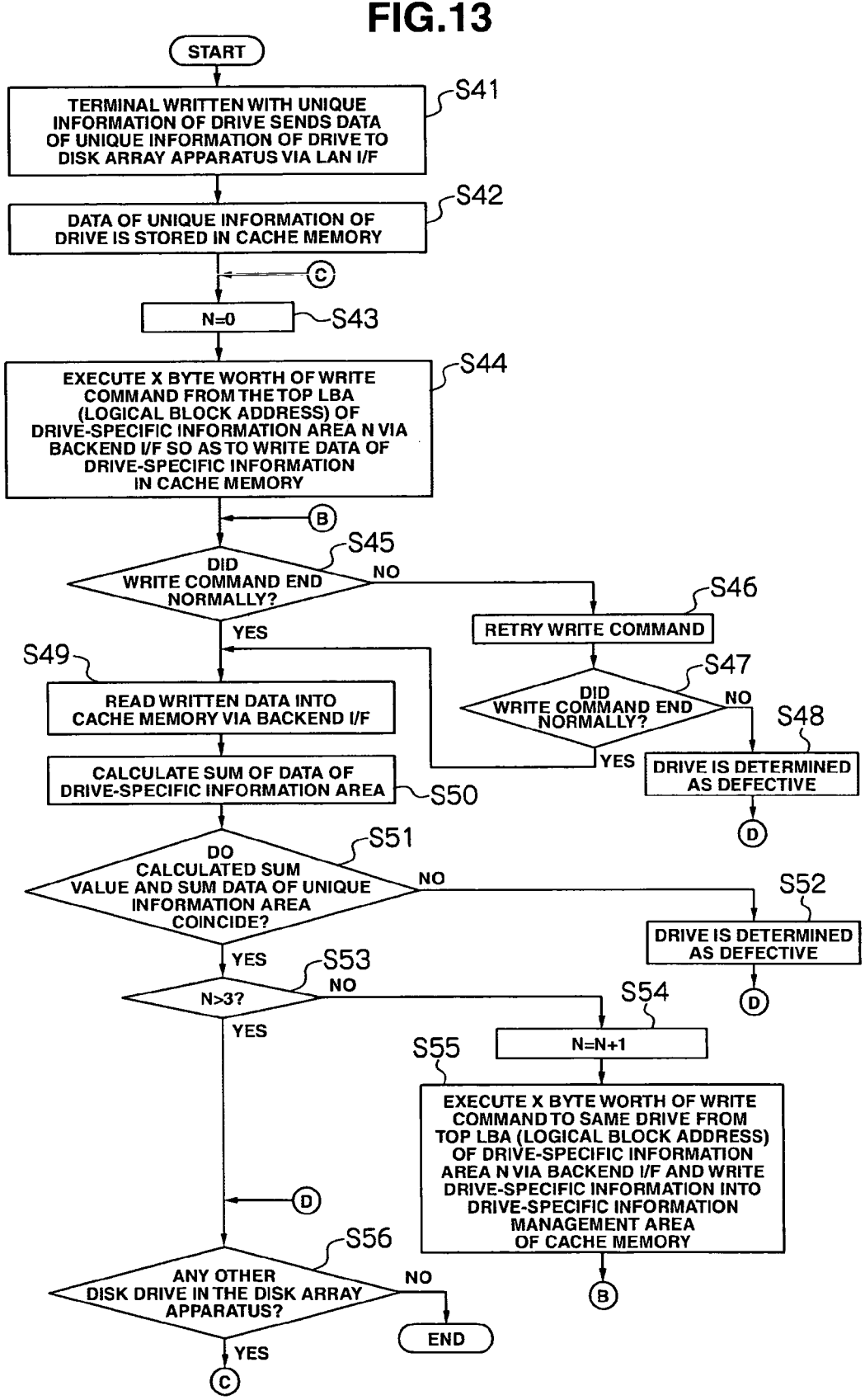
FIG. 13 is a flowchart explaining the processing upon writing unique information into the disk drive.

The operation of writing unique information into the disk drive is now explained with reference to the flowchart of FIG. 13. This sequential processing is realized based on processing of the external writing terminal and the microprocessor 142 of the disk controller 140. Foremost, the external writing terminal for writing the unique information of the disk drive sends data concerning the unique information of the disk drive to the disk controller (disk array apparatus) 140 via the LAN interface unit 141 (S41).

In response, the disk controller 140 stores data concerning the unique information of the disk drive in the drive-specific information management area of the cache memory 140 (S42), sets the number N showing the redundancy to 0 (S43), and executes X-byte worth of write command from the top LBA (logical block address) of the user data area 310 of one disk drive; for instance, the alternative disk drive, via the back-end interface unit 144 in order to write data concerning the unique information of the disk drive into the cache memory 143 (S44). Thereafter, the disk controller 140 determines whether the write command ended normally (S45), and, when it did not end normally, retries the write command (S46), determines once again whether the write command ended normally (S47), and determines that the disk drive is defective when the write command did not end normally (S48).

Meanwhile, when it is determined at step S45 or step S47 that the write command ended normally, the disk controller 140 reads the written data from the cache memory 143 via the back-end interface unit 144 (S49), calculates the SUM of data in the management area 340 of the disk drive (S50), determines whether the calculated SUM value and the SUM stored in the management area 340 coincide (S51), determines that the disk drive is defective when they do not coincide (S52), and determine whether the numerical value N is greater when 3 when they coincide (S53). When N is smaller than 3, N is set to +1 (S54), and X-byte worth of write command is executed in order to write data in the cache memory 143 into the same disk drive until N becomes 3 from the top LBA in the user data area 310 of the disk drive via the back-end interface unit 144 (S55), and the routine returns to the processing at step S45.

Meanwhile, when it is determined at step S53 that N is greater than 3, the disk controller 140 determines, as with the case of determining that this drive is defective, whether there is any other disk drive in the disk array apparatus (S56), returns to the processing at step S43 to perform processing to the other disk drives once again when there is another disk drive, and ends this processing routine when there is no other disk drive. Thereby, the unique information 320, 321, 322, 323 can be stored in the user data area 310 of the alternative disk drive.

Figure 14A:
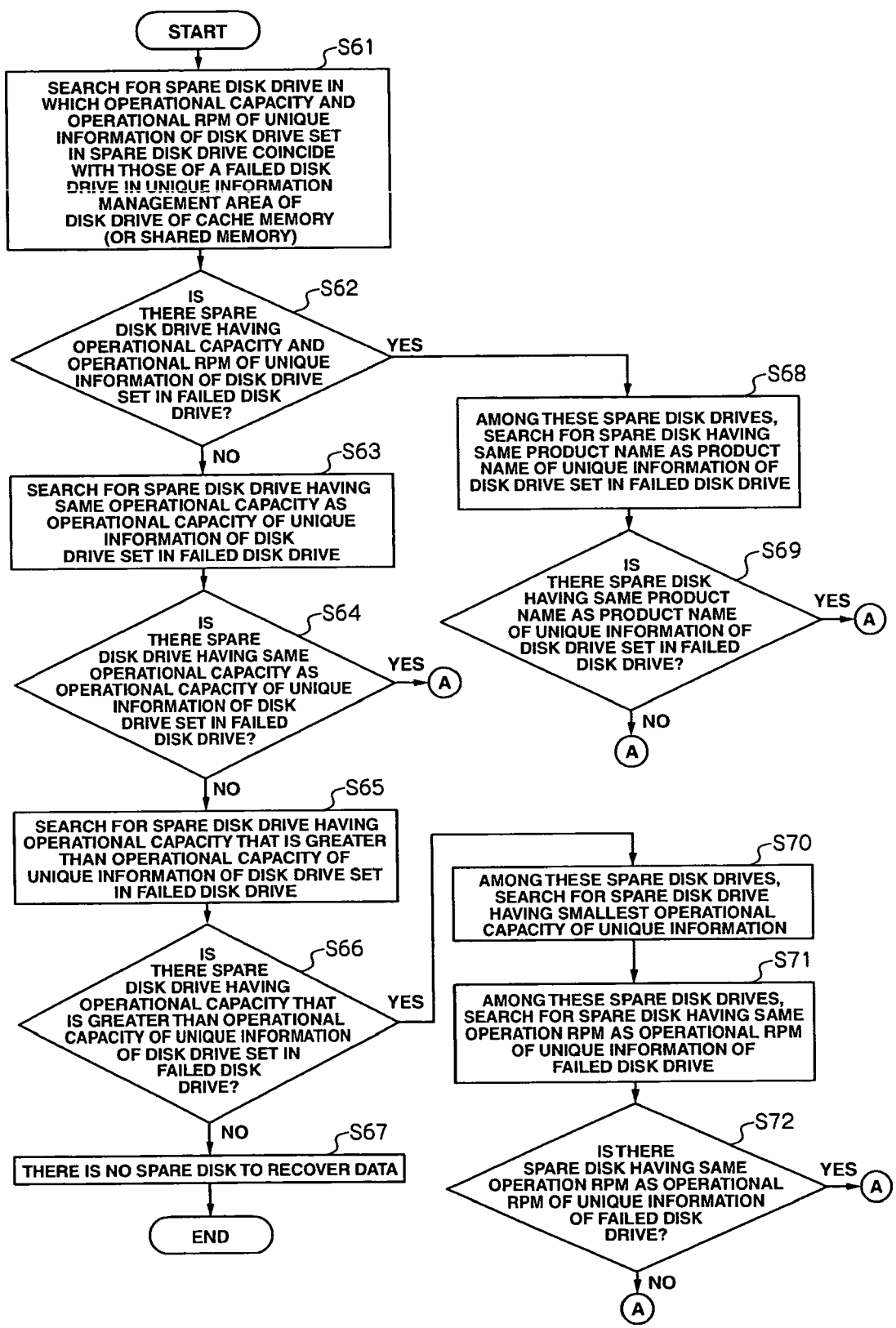
FIG. 14A and FIG. 14B are flowcharts explaining the processing upon selecting a spare disk drive for recovering data of a failed disk drive.
Figure 14B:
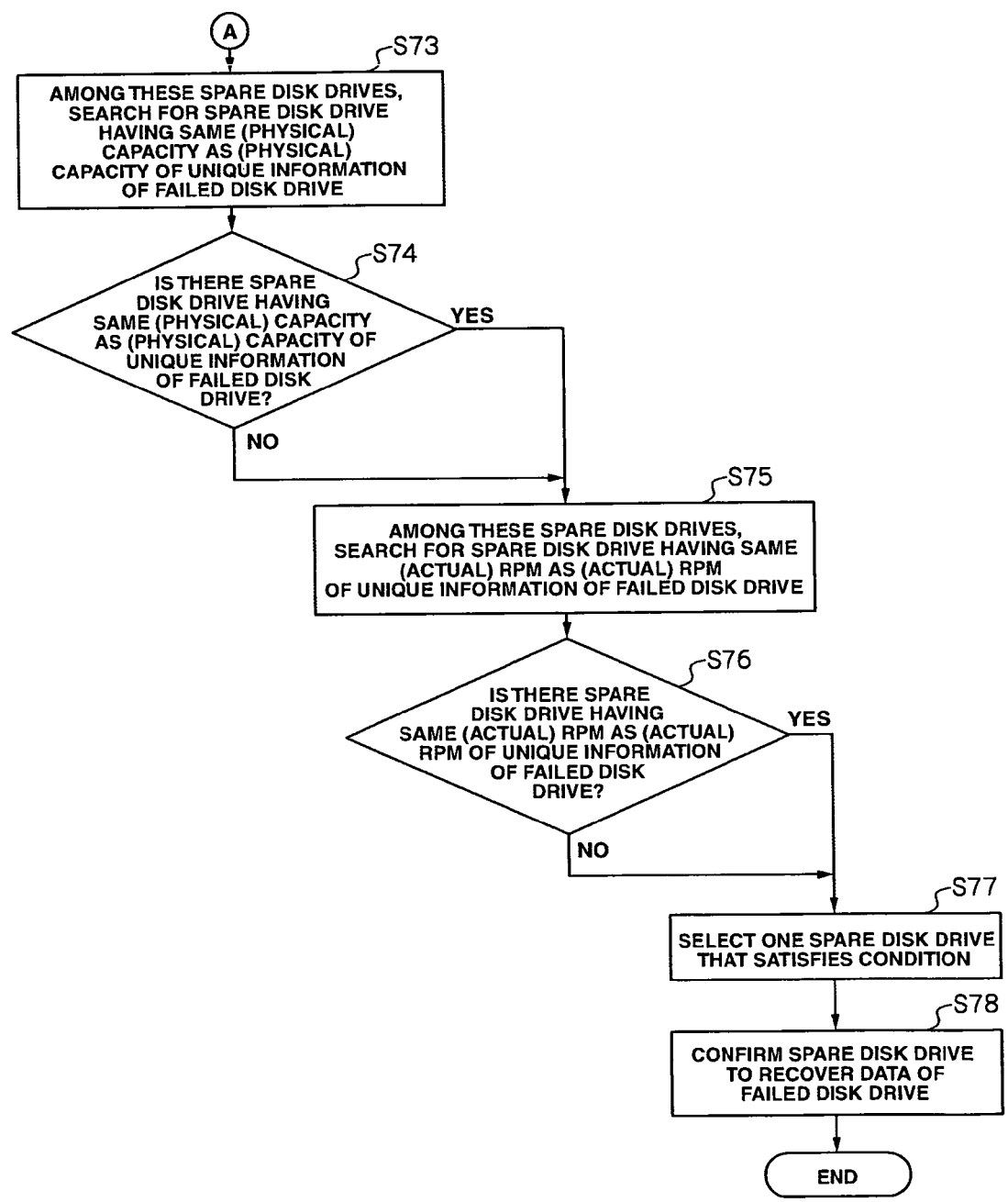

The operation of selecting one spare disk drive for recovering data of a failed disk drive when a plurality of spare disk drives are set and one of the disk drives configuring RAID malfunctions is now explained with reference to the flowchart of FIG. 14. Here, the spare disk drive is based on the assumption that there is constantly at least one disk drive with the same unique information as the disk drive configuring RAID. This sequential operation is realized by the microprocessor of the disk controller 140 based on the micro program.

Foremost, the disk controller 140 searches for a spare disk drive in which the operational capacity and operational rotating speed as the unique information of the disk drive set in the spare disk drive coincide with those of the failed disk drive in the unique information management area of the disk drive in the cache memory (or shared memory) (S61), and determines whether there is a spare disk with the operational rotating speed that coincides with the operational capacity of the unique information of the failed disk drive (S62). When no such spare disk exists, the disk controller 140 searches for a spare disk drive with the same operational capacity as the operational capacity of the unique information of the failed disk drive (S63), and determines whether there is a spare disk with the same operation capacity as the operational capacity of the unique information of the failed disk drive (S64). When no such spare disk exists, the disk controller 140 searches for a spare disk drive having a capacity that is greater than the operational capacity of the unique information of the failed disk drive as the operational capacity of the unique information (S65), and determines whether there is a spare disk drive having a capacity that is greater than the operational capacity of the unique information of the failed disk drive as the operational capacity of the unique information (S66). When no such spare disk exists, the disk controller 140 determines that there is no spare disk capable of recovering data (S67), and ends this processing routine.

Meanwhile, when the disk controller 140 determines YES at step S62, it searches for a spare disk with the same product name as the product name of the unique information of the failed disk drive among the foregoing spare disk drives (S68), and determines whether there is a spare disk with the same product name as the product name of the unique information of the failed disk drive (S69), and then proceeds to the processing at step S73.

Further, when the disk controller 140 determines YES at step S66, it searches for a spare disk drive with the smallest operational capacity of the unique information among the foregoing spare disk drives (S70), subsequently searches for a spare disk with the same operational rotating speed as the operational rotating speed of the unique information of the failed disk drive among the foregoing spare disk drives (S71), and determines whether there is a spare disk with the same operational rotating speed as the operational rotating speed of the unique information of the failed disk drive (S72), and then proceeds to the processing at step S73.

At step S73 the disk controller 140 searches for a spare disk drive having the same (physical) capacity as the (physical) capacity of the unique information of the failed disk drive among the foregoing spare disk drives, and determines whether there is a spare disk drive having the same (physical) capacity as the (physical) capacity of the unique information of the failed disk drive (S74). Subsequently, the disk controller 140 searches for a spare disk drive having the same actual rotating speed as the actual rotating speed of the unique information of the failed disk drive among the foregoing spare disk drives (S75), and determines whether there is a spare disk drive having the same actual rotating speed as the actual rotating speed of the unique information of the failed disk drive (S76). The disk controller 140 thereafter selects one spare disk drive satisfying the foregoing conditions (S77), decides on the spare disk drive to recover the data of the failed disk drive (S78), and then ends this processing routine.

Incidentally, in this processing, the priority in the foregoing processing of the physical capacity and actual rotating speed may be switched.

Figure 15:
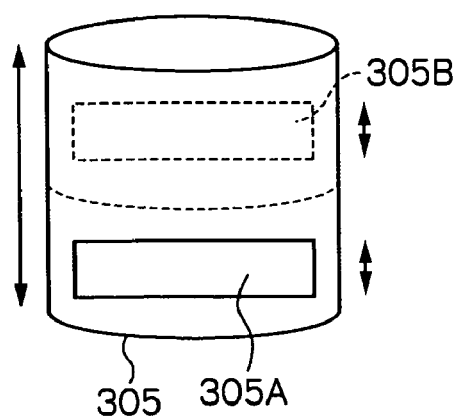
FIG. 15 is a configuration diagram upon dividing the area of an alternative disk drive media into a plurality of areas.

Further, upon writing data into the alternative disk drive, when the capacity of the alternative disk drive 305 is greater than the capacity of the disk drive belonging to the RAID group as shown in FIG. 15, a configuration may be adopted where the physical media area of the alternative disk drive 305 is partitioned into a plurality of areas 305A, 305B, and data are written into the respective areas 305A, 305B.

Here, data stored in the one of the areas can be used in a normal read command, and, when the media malfunctions, the RAID with the parity disk will read the data through correction. Nevertheless, when the same data is mirrored in the same disk drive, it will suffice to read data of the other area.

This control is possible because information of two capacities; namely, the operational capacity and the actual physical capacity, which cannot be acquired from a standard interface of the disk drive, are provided in the media area of the respective disk drives, and the disk controller is managing such capacities.

Figure 16:
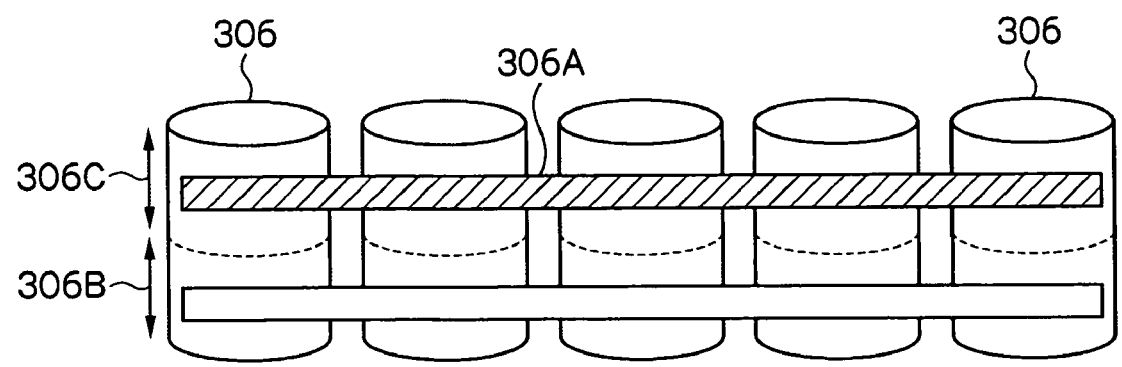
FIG. 16 is a configuration diagram upon adopting a configuration of mirroring data of LU in all disk drives configuring a RAID group.

Further, as shown in FIG. 16, it is also possible to adopt a configuration where data of the LU (logical unit) is mirrored in all disk drives 300 configuring the RAID group. In other words, when there is a difference between the operational capacity and the physical capacity in all disk drives 306 configuring the RAID group, an area 306A may be set in the disk drives configuring the RAID group for the mirrored data.

Here, the media area of the disk drive is separated into a media area 306B in use and a media area 306C that appears to be unused, and, since the host computer is not able to recognize this area 306C, this area is available to the storage control system as a replica of the LU that can be recognized by the host computer.

There is a function having a replicated LU. To create a replicated LU, it is generally necessary to use the media area 306B in use for the same capacity as the original LU. Here, it is possible to create a replicated LU without using additional capacity. Nevertheless, disk drives having a media area 306B in use configuring the RAID group are configured from disk drives having an area 306C that appears to be unused, and the alternative disk drives to be replaced due to a failure in the disk drive must also be disk drives that satisfy the same conditions.

According to this embodiment, unique information including the logical type name is stored in the media (user data area 310 or management area 340) of the alternative disk drive to become an alternative of the storage device 300, and, upon using the alternative disk drive, the disk controller 140 reads the unique information of the alternative disk drive, and determines that copy back is unnecessary when the logical type name of the alternative disk drive is the same as the logical type name of the disk drive belonging to RAID, and otherwise determines that copy back is necessary; that is, the disk controller 140 determines that copy back is necessary when the logical type names are not the same. Thus, it is possible to reliably determine the necessity of copy back using a standard interface of a disk drive by determining the logical type name as the unique information of the alternative disk drive.

Further, according to this embodiment, unique information including the logical type name is stored in the media (user data area 310 or management area 340) of the alternative disk drive to become an alternative of the storage device 300, and, upon using the alternative disk drive, the disk controller 140 reads the unique information of the alternative disk drive, and determines that copy back is unnecessary when the rotating speed and capacity of the alternative disk drive are the same as the rotating speed and capacity of the disk drive belonging to RAID, and otherwise determines that copy back is necessary; that is, the disk controller 140 determines that copy back is necessary when the rotating speed and capacity are not the same. Thus, it is possible to reliably determine the necessity of copy back using a standard interface of a disk drive by determining the rotating speed and capacity as the unique information of the alternative disk drive.

In addition, according to the present embodiment, the foregoing processing is applicable to various types of disk drives such as Fiber Channel, S-ATA, SCSI, SAS and the like, which are data transfer protocols of disk drives.

Processing of obtaining the actual rotating speed of the disk drive as the unique information of the disk drive without being affected by changes in the independent specification of the disk drive manufacturer in a case where the operational rotating speed and the actual rotating speed of the disk drives are different is now explained with reference to the flowchart of FIG. 17. This sequential operation is realized by the microprocessor of the disk controller 140 based on the micro program.

Foremost, the disk controller 140 starts a timer for monitoring the response of the respective drives in a case of executing a read command to a plurality of disk drives in the same RAID group, or executing a write command to a plurality of disk drives in the same RAID group (S81), weighs the length of the time-out timer according to the actual rotating speed of the unique information of the respective disk drives in the disk drives that received the command, and monitors the time-out of the command (S82).

This is because a disk drive with a small actual rotating speed is inferior in responsiveness in comparison to a disk drive with a large actual rotating speed, and, since the response time of the command will also become relatively longer, the time-out timer of the command of a disk drive with a small actual rotating speed should be set to a greater value than the time-out timer of the command of a disk drive with a large actual rotating speed.

The disk controller 140 determines whether there is a command in which the time-out timer detected a time-out while monitoring the time-out of the command (S83), and ends this processing routine when there is no such command and rewrites the command and sets the time-out timer to the same value once again (S84). The disk controller 140 thereafter determines whether there is a command in which the time-out timer detected a time-out while monitoring the time-out of the command (S85), and ends this processing routine when there is no such command and determines whether the retry count of the command has exceeded a prescribed value (S86). When the command did not exceed a prescribed value, the routine proceeds to the processing at step S84, and, when the command exceeded a prescribed value, the disk drive is determined as defective, and this processing routine is ended without executing the command (S87).

According to this embodiment, even when the operational rotating speed and the actual rotating speed of the disk drives are different, it is possible to obtain the actual rotating speed of the disk drive as the unique information of the disk drive using a standard interface of the disk drive and without being affected by changes in the independent specification of the disk drive manufacturer. Thus, it is possible to use information concerning the actual rotating speed to determine the response delay of the disk drive according to the difference in the rotating speed of the disk drives. Incidentally, the shared memory and the cache memory may be configured as the same memory. Moreover, the media storing unique information is the media storing the user data of disk drives.

What is claimed is:

1. A storage control system, comprising:
   a plurality of storage apparatuses; and
   a controller for sending and receiving data between said plurality of storage apparatuses and a host system; each of said storage apparatuses includes: a plurality of storage mediums configuring a plurality of RAID groups; and a plurality of spare mediums for saving stored data of a storage medium subject to a failure among said plurality of storage mediums;
   wherein each of said plurality of storage apparatuses stores a physical capacity, a physical performance, an operational capacity, and an operational performance thereof as unique information, said operational capacity and operational performance being used for managing a plurality of storage apparatuses having different physical capacities and physical performances, as same-type storage apparatuses, wherein when one of said plurality of storage mediums failed, the controller:
  searches for at least one spare medium whose operational performance and operational capacity are same as those of the failed storage medium, among said plurality of spare mediums;
  determines, if no such at least one spare medium exists, that there is no spare medium capable of recovering data;
  selects, if more than one spare medium exist, one of them based on comparison between physical performances and physical capacities of the spare mediums and those of the failed storage medium; and
  recovers the data stored in the failed storage medium to the selected storage medium.

2. The storage control system according to claim 1, wherein when one of said plurality of storage mediums failed, the controller:
  searches for at least one spare medium whose operational capacity are same as those of the failed storage medium, among said plurality of spare mediums; and
  determines, if no such at least one spare medium exists, that there is no spare medium capable of recovering data.

3. The storage control system according to claim 1, wherein if at least one spare medium whose operational performance and operational capacity are the same as those of the failed storage medium exists, the controller:
  searches for a spare medium with the same product name as the product name of the unique information of the failed disk drive among the foregoing spare mediums; and
  determines whether there is a spare medium with the same product name as the product name of the unique information of the failed storage medium.

4. The storage control system according to claim 1, wherein the unique information is stored in a plurality of sections in each of the plurality of storage apparatuses according to a designated redundancy.

5. The storage control system according to claim 1, wherein after one of a plurality of storage mediums fail, the controller determines if the data should be copied from the selected spare medium to am alternative medium based on said unique information.

6. A storage control system, comprising:
  a channel controller for controlling an I/O request to a plurality of storage apparatuses in response to a data I/O request from a host system;
  a disk controller for controlling the I/O request of said data with said plurality of storage apparatuses;
  a shared memory for storing control information;
  a cache memory for temporarily storing control data;
  a disk storage apparatus as plurality of storage apparatuses to be connected to said disk controller; and
  a connection for mutually connecting said channel controller, said disk controller, said shared memory, and said cache memory;
  wherein said disk storage apparatus includes:
  a plurality of disk drives configuring a plurality of RAID groups;
  a plurality of spare disk drives for saving stored data of a disk drive subject to a failure among said plurality of disk drives;
  wherein each of said plurality of storage apparatuses stores a physical capacity, a physical performance, an operational capacity, and an operational performance thereof as unique information, said operational capacity and operational performance being used for managing a plurality of storage apparatuses having different physical capacities and physical performances, as same-type storage apparatuses,
  wherein when one of said plurality of disk drives failed, said disk controller is configured to:
  search for at least one spare disk drive whose operational performance and operational capacity are same as those of the failed disk drive, among said plurality of disk drives;
  determine, if no such at least one spare disk drive exists, that there is no spare disk drive capable of recovering data;
  select, if more than one spare disk drive exist, one of them based on comparison between physical performances and physical capacities of the spare disk drives and those of the failed storage disk drive; and
  recover the data stored in the failed disk drive to the selected disk drive.

7. The storage control system according to claim 6, wherein the unique information stored in the media of said alternative disk drive includes the rotating speed and capacity as with the disk drives configuring said RAID group; and
  said disk controller is configured to determine that said copy back is unnecessary when the rotating speed and capacity belonging to the unique information stored in the media of said alternative disk drive are the same as the rotating speed and capacity of the disk drives configuring said RAID group, and otherwise determine that said copy back is necessary.

8. A storage control method of controlling the transfer of data between a plurality of storage apparatuses comprising a plurality of storage mediums mutually configuring a plurality of RAID groups, a plurality of spare mediums for saving stored data of a storage medium subject to a failure among said plurality of storage mediums, wherein each of said plurality of storage apparatuses stores a physical capacity, a physical performance, an operational capacity, and an operational performance thereof as unique information, said operational capacity and operational performance being used for managing a plurality of storage apparatuses having different physical capacities and physical performances, as same-type storage apparatuses, said method, comprising:
  detecting a failure in one of said plurality of storage mediums;
  searching for at least one spare medium whose operational performance and operational capacity are same as those of the failed storage medium, among said plurality of spare mediums;
  determining, if no such at least one spare medium exists, that there is no spare medium capable of recovering data;
  selecting, if more than one spare medium exist, one of them based on comparison between physical performances and physical capacities of the spare mediums and those of the failed storage medium; and
  recovering the data stored in the failed storage medium to the selected storage medium.

9. The storage control method according to claim 8, wherein when one of said plurality of storage mediums failed, the method further comprises the steps of:
  searching for at least one spare medium whose operational capacity are same as those of the failed storage medium, among said plurality of spare mediums; and
  determining, if no such at least one spare medium exists, that there is no spare medium capable of recovering data.

10. The storage control method according to claim 8, wherein if at least one spare medium whose operational performance and operational capacity are the same as those of the failed storage medium exists, the method further comprises the steps of:

searching for a spare medium with the same product name as the product name of the unique information of the failed disk drive among the foregoing spare mediums; and determining whether there is a spare medium with the same product name as the product name of the unique information of the failed storage medium.

11. The storage control method according to claim 8, wherein the unique information is stored in a plurality of sections in each of the plurality of storage apparatuses according to a designated redundancy.

12. The storage control method according to claim 8, wherein after one of a plurality of storage mediums fail, the method further comprises the step of determining if the data should be copied from the selected spare medium to am alternative medium based on said unique information.

\* \* \* \* \*